United States Patent [19]

Ishiyama

[11] Patent Number: 4,498,741
[45] Date of Patent: Feb. 12, 1985

[54] COMPACT, WIDE MAGNIFICATION-VARIABLE ZOOM LENS SYSTEM

[75] Inventor: Shozo Ishiyama, Hino, Japan

[73] Assignee: Konishiroku Photo Industry Co., Ltd., Tokyo, Japan

[21] Appl. No.: 364,257

[22] Filed: Apr. 1, 1982

[30] Foreign Application Priority Data

Apr. 3, 1981 [JP] Japan ................................. 56-49346

[51] Int. Cl.³ .......................... G02B 9/64; G02B 15/18
[52] U.S. Cl. ................................................ 350/427
[58] Field of Search ......................................... 350/427

[56] References Cited

U.S. PATENT DOCUMENTS 4,380,377 4/1983 Sato et al. ........................... 350/427

Primary Examiner—John K. Corbin
Assistant Examiner—Rebecca D. Gass
Attorney, Agent, or Firm—Jordan B. Bierman

[57] ABSTRACT

A zoom lens system composed of five lens groups having power of positive, negative, positive, negative and positive, among various types of the zoom lens system. The zoom lens system particularly of the type in which all of five lens groups are movable is advantageous in designing the zoom lens system. However, since these five lens groups are moved independently one another, it becomes complicated to design the barrel. In accordance with the present invention, a third positive lens group and one of the other positive lens groups may be moved integrally to effect zooming, such that the moving mechanism for the four moving groups may be used in designing the barrel, thus simplifying the construction of the barrel.

20 Claims, 14 Drawing Figures

TELE - POSITION

FIG. 1
TELE - POSITION
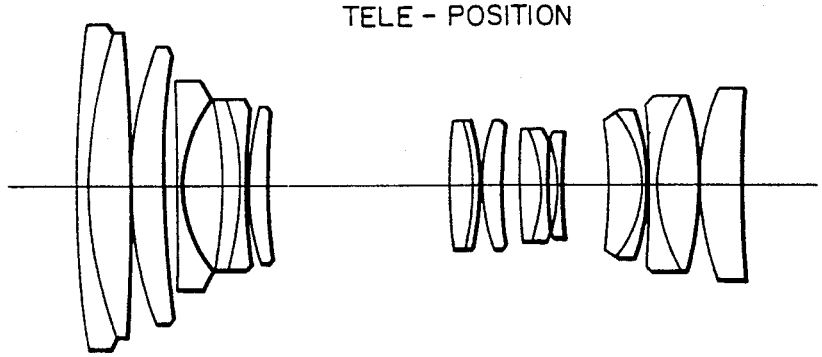
WIDE- POSITION
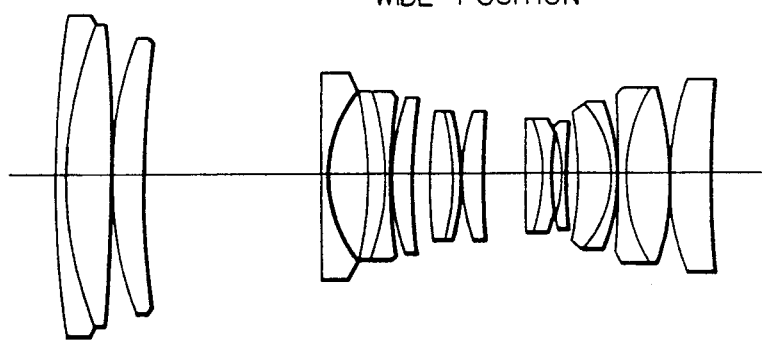

FIG. 2
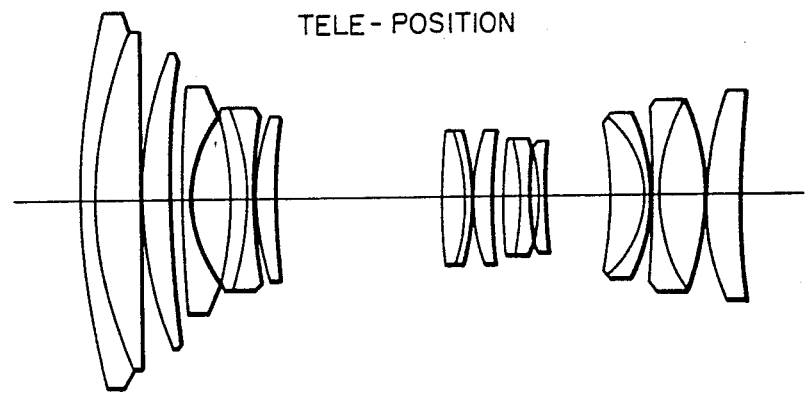
TELE-POSITION
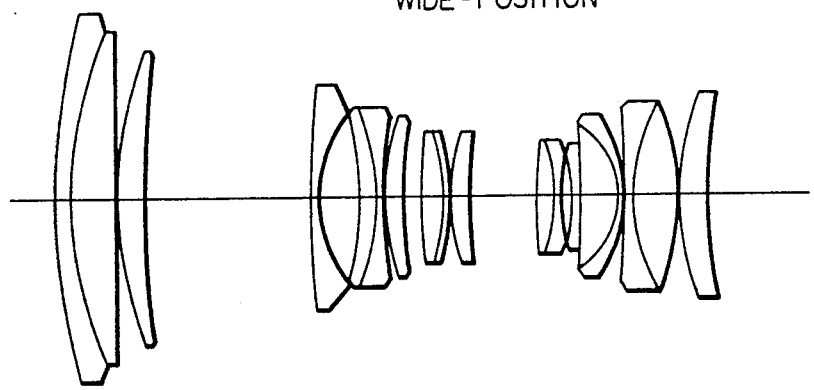
WIDE-POSITION

FIG. 3
TELE-POSITION
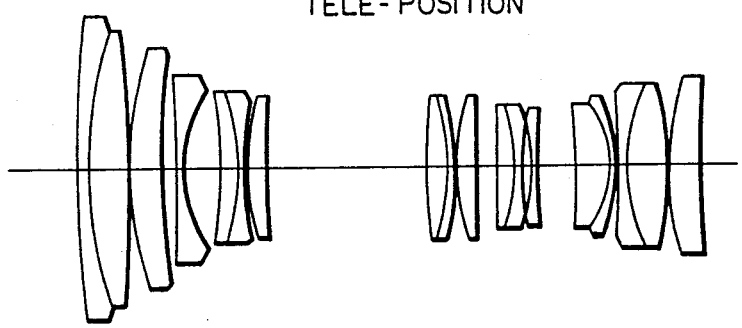
WIDE-POSITION
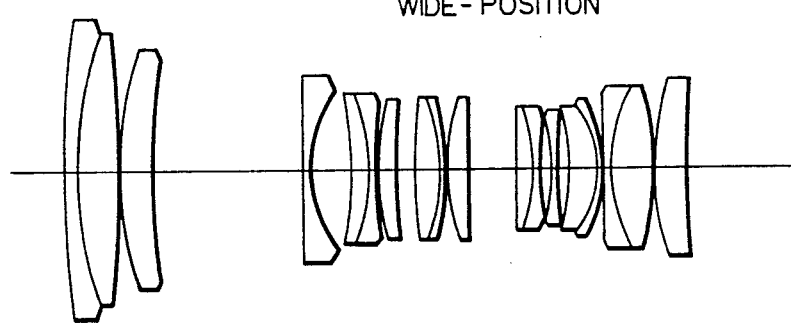

FIG. 4
TELE-POSITION
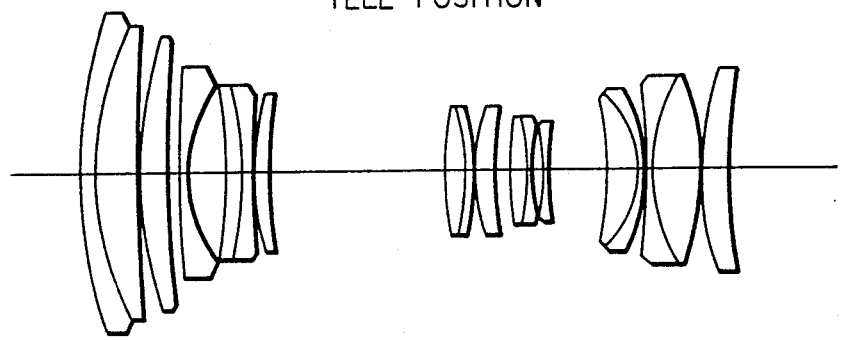
WIDE-POSITION
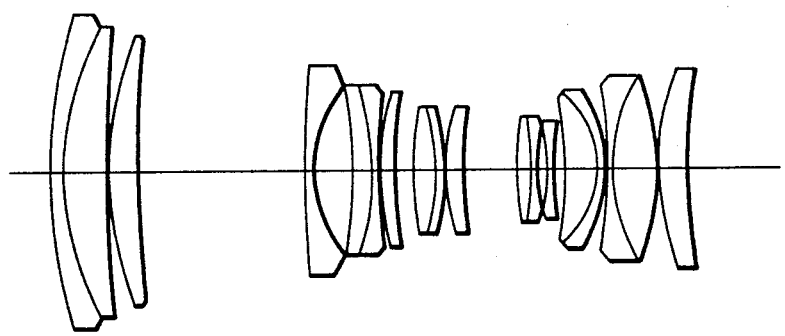

FIG. 6
TELE-POSITION
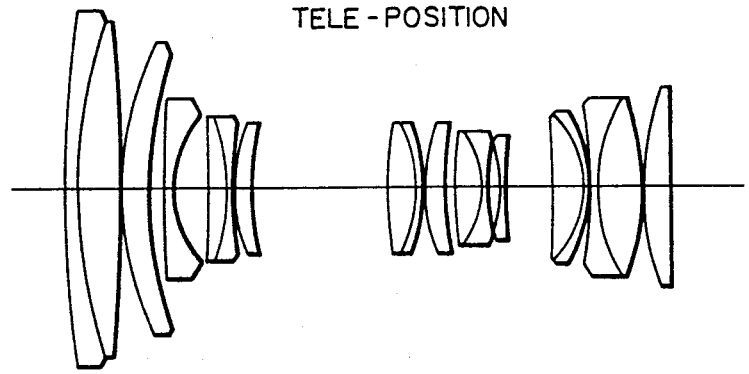
WIDE- POSITION
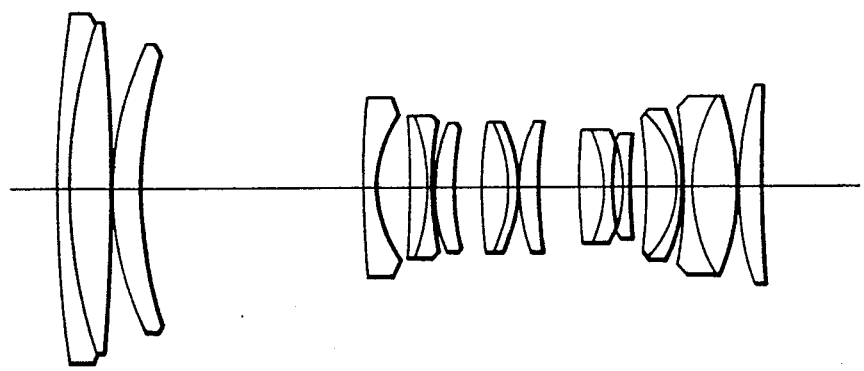

FIG. 7
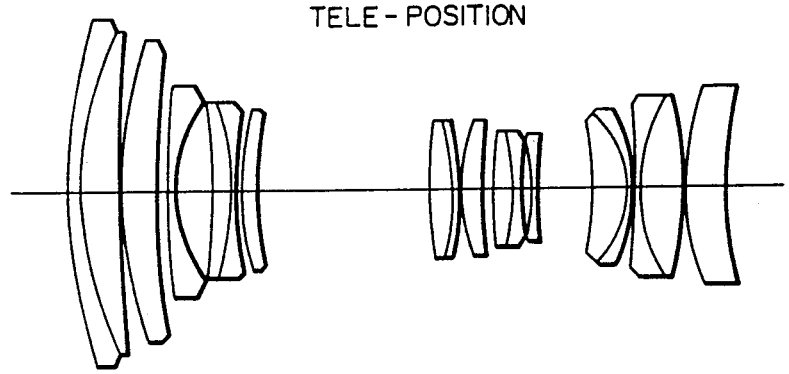
TELE-POSITION
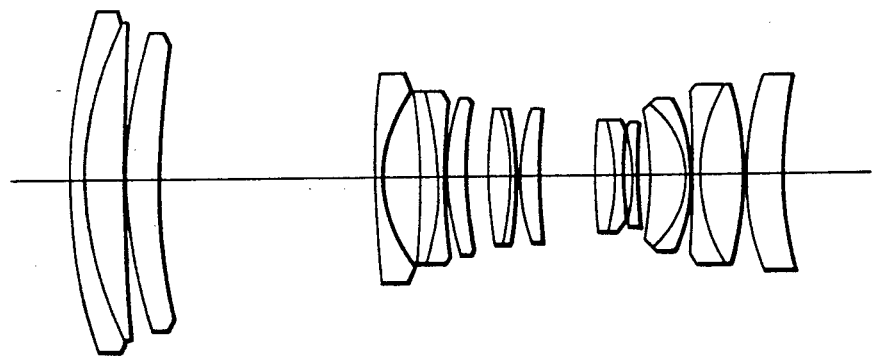
WIDE-POSITION

COMPACT, WIDE MAGNIFICATION-VARIABLE ZOOM LENS SYSTEM

BACKGROUND OF THE INVENTION

1. Field of the Invention

The present invention relates to a compact zoom lens system for still cameras of a new lens-moving type including a field from the wide angle to the long focal length.

2. Description of the Prior Art

Several types of zoom lenses including a field from the wide angle to the long focal length have been heretofore known as follows:

(1) old type or so-called mechanically-corrected type zoom lens, (2) zoom lens of the type composed of four movable lens groups having power of positive, negative, positive and positive, in which a first lens group and a fourth lens group in the (1) zoom lens as described above are moved, (3) zoom lens composed of three movable lens groups having power of positive, negative and positive, (4) wide-angle type zoom lens in which a lens group having a negative power precedes, and (5) zoom lens composed of five movable lens groups having power of positive, negative, positive, negative and positive.

In the case a zoom lens system is desired to be obtained which has a focal length shorter than a diagonal line of an image plane at the wide position and has a focal length longer than a two-fold of a diagonal line of an image plane at the tele position, as in the present invention, these zoom lenses of the types as described above have the following problems though they have merits and demerits.

In the zoom lens of the (1) type, a diameter of the front lens becomes large to increase the lens system as a whole.

In the zoom lens of the (2) type, the lens system is rendered compact readily as compared with that of the (1) type but the structure of the lens system is unsymmetrical as positive, negative, positive and positive, which makes it difficult to correct distortion aberration and coma aberration.

In the zoom lens of the (3) type, since the structure is simple, the lens system must be enlarged or power of the individual lens groups must be strengthened in order to increase the zooming ratio, and if the power is strengthened for compactness, correction of aberrations becomes difficult.

In the zoom lens of the (4) type, this basically has the structure of the retrofocus type which is difficult to correct spherical aberration at the tele position.

In the zoom lens of the (5) type, the structure of lens system is symmetrical and many lens groups contribute to magnification variation and thus this zoom lens is suitable to obtain a large zooming ratio while keeping compactness. However, since five lens groups are independently moved, the construction of the lens frame unavoidably becomes complicated.

SUMMARY OF THE INVENTION

In view of the fact that the zoom lens of the (5) type among various types of the zoom lenses as described above is most suitable for the structure of the compact zoom lens having a ratio of wide variations in magnification, the present invention has overcome the complicatedness of construction of the lens frame, which is encountered as a mere disadvantage in the zoom lens of the (5) type, by providing an improvement wherein some of five lens groups are integrally moved.

More specifically, there is provided a zoom lens system comprising a first lens group having a positive focal length, a second lens group having a negative focal length, a third lens group having a positive focal length, a fourth lens group having a negative focal length and a fifth lens group having a positive focal length in the order from the object side, the arrangement comprising the structures (1) wherein over the entire range of zooming, a partial system consisting of the first lens group and the second lens group has a negative resultant focal length and a partial system consisting of the third through fifth lens groups has a positive resultant focal length; (2) wherein two lens groups consisting of the third lens group and another positive lens group are moved integrally; and (3) wherein when zooming is carried out from the wide position to the tele position, the individual lens groups are moved so that an airspace formed between the first lens group and the second lens group and an airspace formed between the third lens group and the fourth lens group may be increased while an airspace formed between the fourth lens group and the fifth lens group may be decreased.

Among the above-described structures, the structure (1) corresponds to the arrangement wherein the focal length at the wide position is made shorter than a diagonal line of a field angle. In such a case, it is desirable in terms of aberration correction that the lens of the retrofocus type is arranged at the wide position. Accordingly, in the present invention, the retrofocus type arrangement is employed by the provision such that a partial system consisting of the first lens group and the second lens group has a negative resultant focal length and a partial system consisting of the third through fifth lens groups has a positive resultant focal length. With respect to symbols of focal lengths in these two partial lens systems, discontinuous movement of the lens groups occur unless the same symbols are used in the entire range of zooming, resulting in a failure to call it as the zoom lens system, and therefore, with respect to the symbols of resultant focal lengths in two partial lens systems, the same symbols as those used in the wide position are used even in the tele position.

With respect to the structure (2), this simplifies the construction of the lens frame as previously mentioned.

Despite employment of the retrofocus type arrangement at the wide position because of the provision of the structure (1), it is desirable in terms of aberration correction to employ the telephoto type arrangement at the tele position. To this end, as in the structure (3), the airspace between the first lens group and the second lens group should be the smallest at the wide position and the largest at the tele position, whereas the airspace between the second lens group and the third lens group should be the largest at the wide position and the smallest at the tele position.

Also, to increase contribution of the partial system from the third lens group to the fifth lens group to the zooming ratio, it is desirable that a main plane of said partial system is present towards the image side as close as possible at the wide position and is present towards the object side as close as possible at the tele position. This can be realized by employment of the retrofocus type arrangement at the wide position and of the telephoto type arrangement at the tele position, in the partial system from the third lens group to the fifth lens group. With this, the airspace between the third lens group and the fourth lens group is the smallest at the wide position and is the largest at the tele position whereas the airspace between the fourth lens group and the fifth lens group is the largest at the wide position and is the smallest at the tele position. It is needless to say that the airspace between the individual lens group must be continuously increased and decreased in order to provide smooth movement of the lens group.

The zoom lens system of the present invention constructed as described above can be made similarly to an arrangement wherein the zoom lens is composed of four lens groups in terms of construction of the lens frame while being composed of five lens groups. Moreover, if one out of four moving groups is locked, the construction of the lens frame is further simplified, and it can be taken that the zoom lens is composed of three lens groups in terms of construction of the lens frame while being composed of five moving lens groups.

If it is designed so that three lens groups, which are positive groups and comprise the first lens group, the third lens group and the fifth lens group, are moved together, the number of moving groups is substantially further reduced by one to further simplify the construction of the lens frame but it becomes difficult to enlarge the range of focal length towards the tele position.

The zoom lens system having the above-described basic structure should desirably satisfy the following conditions:

$$0.2 f_w < t_{3,4} + t_{4,5} < 0.5 f_w \quad (1)$$

$$0.8 f_T < f_1 < 1.3 f_T \quad (2)$$

$$0.5 f_w < |f_2| < 1.0 f_w \quad (3)$$

$$0.6 f_w < f_3 < 1.0 f_w \quad (5)$$

$$0.5 f_w < |f_4| < 1.0 f_w \quad (5)$$

$$0.9 f_w < f_5 < 1.5 f_w \quad (6)$$

$$0.9 f_w < |f_{1.2w}| < 1.5 f_w \quad (7)$$

$$0.8 \sqrt{v} < f_{1.2T}/f_{1.2w} < 1.2 \sqrt{v} \quad (8)$$

wherein the reference symbols are defined as follows:
$f_w$: focal length of the zoom lens system as a whole at its wide position
$f_T$: focal length of the zoom lens system as a whole at its tele position
$f_i$: focal length of the ith lens group from the object side
$f_{1.2w}$: focal length of the partial system consisting of the first and second lens groups at the wide position
$f_{1.2T}$: focal length of the aforesaid partial system at the tele position
V: zooming ratio $f_T/f_w$
$t_{i,i+1}$: airspace between the ith lens group and the i+1 lens group
$t_{i,i+1w}$: $t_{i,i+1}$ at the wide position
$t_{i,i+1T}$: $t_{i,i+1}$ at the tele position The condition (1) defines the airspace between the lens groups.

To reduce a difference between astigmatism and coma aberration at the individual focal lengths, it is desirable that the value of $t_{3,4}+t_{4,5}$ is the largest at the wide position.

If said value exceeds the lower limit of the condition (1), the partial system consisting of the third through the fifth lens group is less contributed to the magnification variation and the rate of bearing the zooming ratio of the lens system by the partial system consisting of the first lens group and the second lens group becomes excessively large to render it difficult to correct a difference between the aberrations at the individual focal lengths. On the contrary, if said value exceeds the upper limit, the lens system will be enlarged and the distortion aberration is undercorrected at the wide position.

The conditions (2) through (6) define the refractive power of the individual lens groups. If $f_1$ is smaller than the lower limit of the condition (2), high order spherical aberration will be undercorrected at the tele position. Conversely, if $f_1$ exceeds the upper limit, the lens system will be enlarged and distortion aberration will be overcorrected at the tele position.

If $|f_2|$ is smaller than the lower limit of the condition (3), distortion aberration will be undercorrected at the wide position, and conversely, if $|f_2|$ exceeds the upper limit, the lens system will be enlarged and the difference will be remarkable between spherical aberration at the wide position and that at the tele position.

If $f_3$ is smaller than the lower limit of the condition (4), unsymmetrical coma aberration will be produced and distortion aberration will be undercorrected at the wide position. Conversely, if $f_3$ exceeds the upper limit, the lens system will be enlarged and spherical aberration will be overcorrected at the wide position.

If $|f_4|$ and $f_5$ are smaller than the lower limit of the conditions (5) and (6), correction of aberration will be adversely affected similarly to the case where $f_3$ is smaller than the lower limit of the condition (4). Conversely, if such value exceeds the upper limit, the lens system will be enlarged and distortion aberration will be overcorrected at the tele position.

The condition (7) defines the magnitude of resultant focal length of the partial system consisting of the first lens group and the second lens group at the wide position. If such value is smaller than the lower limit of the condition 7, f1 decreases or $|f_2|$ increases. Conversely, if the value exceeds the upper limit, f1 increases or $|f_2|$ decreases, resulting in the same inconvenience as described in connection with the conditions (2) and (3). Further, if $|f_{1.2w}|$ is smaller than the lower limit of the condition (7), $t_{2.3}$ at the wide position is small and $t_{1.2}+t_{2.3}$ is excessively small. Conversely, if such value exceeds the upper limit, the lens system will be enlarged.

The condition (8) limits contribution of the partial system consisting of the first lens group and the second lens group to the zooming ratio. If $f_{1.2T}/f_{1.2w}$ is smaller than the lower limit of the condition (8), high order spherical aberration will be undercorrected at the tele position. Conversely, if such value exceeds the upper limit, the lens system will be enlarged and difference will be remarkable between distortion aberration at the wide position and that at the tele position.

To effect integral movement of the third lens group and the other positive lens group, there is one case wherein the first lens group and the third lens group are integrally moved and the other case wherein the third lens group and the fifth lens group are integrally moved.

In the case where the first lens group and the third lens group are integrally moved, $t_{1,2}+t_{2,3}$ remains kept constant even during zooming. The following condition should desirably be satisfied.

$$0.6f_W < t_{1,2}+t_{2,3} < 1.2f_W \qquad (9)$$

If the condition (9) exceeds the lower limit, spherical aberration at the tele position is in want of correction. This results from the fact that marginal rays on the axis incident upon the third lens group pass along the high position at the tele position. Conversely, if the condition (9) exceeds the upper limit, the lens system will be enlarged and distortion aberration will be undercorrected at the wide position.

On the other hand, to effect integral movement of the third lens group and the fifth lens group, $t_{3,4}+t_{4,5}$ remains kept constant during zooming, and $t_{1,2}+t_{2,3}$ varies. And, the following condition should desirably be satisfied.

$$0.5f_W < t_{1,2W}+t_{2,3W} < t_{1,2T}+t_{2,3T} < 0.5f_T \qquad (10)$$

The condition (10) means that the airspace between the first lens group and the third lens group is greater in value at the tele position than that at the wide position. If this is reversed, it becomes difficult to correct the spherical aberration at the tele position. If this airspace $t_{1,2W}+t_{2,3W}$ is smaller than the lower limit 0.5 $f_W$, distortion aberration at the wide position is undercorrected, resulting in a difficulty of correction. Conversely, if such value exceeds the upper limit 0.5 $f_T$, distortion aberration at the tele position is overcorrected, resulting in a difficulty of correction.

If the zoom lens system satisfying the above-described condition is further specified, there is provided a zoom lens system which comprises a first lens group consisting of at least one positive lens component, being a doublet consisting of a positive single lens and a negative single lens, a second lens group consisting of two negative lens components and one positive lens component, the first lens component on the object side consisting of a negative single lens in which a powerful concave face is directed towards the image side, a third lens group consisting of at least two positive lens components, one of which is a doublet consisting of a positive single lens and a negative single lens, a fourth lens group consisting of at least two negative lens components, one of which is a doublet consisting of a positive single lens and a negative single lens, a fifth lens group consisting of at least two positive lens components, one of which is a doublet consisting of a positive single lens and a negative single lens, which zoom lens system satisfies the following conditions:

$$0.50f_W < R_{2,2} < 0.85f_W \qquad (11)$$

$$1.7 < N_{p2} \qquad (12)$$

$$1.6 < N_{N2} \qquad (13)$$

$$40 < \nu_{N2} \qquad (14)$$

$$50 < \nu_{p3} \qquad (15)$$

$$40 < \nu_{N4} \qquad (16)$$

wherein the reference symbols are defined as follows:

$R_{2,2}$: radius of curvature of the image side of the first group lens in the second lens group $N_{pi}$: mean value of refractive indices of the positive lens elements arranged in the ith lens group $N_{Ni}$: mean value of refractive indices of the negative lens elements arranged in the ith lens group $\Xi_{pi}$: mean value of Abbe's numbers of the positive lens elements arranged in the ith lens group $\nu_{Ni}$: mean value of Abbe's numbers of the negative lens elements arranged in the ith lens group The condition (11) is necessary for correcting spherical aberration at the tele position and distortion aberration and image plane curvature at the wide position. If the value in the condition (11) exceeds the lower limit, distortion aberration is undercorrected at the wide position and image plane curvature is overcorrected at the wide position. Conversely, if such value exceeds the upper limit, spherical aberration is undercorrected at the tele position.

The condition (12) is necessary for correcting spherical aberration at the tele position. If the value in the condition (12) exceeds the lower limit, the positive lens functioning to undercorrect spherical aberration in the second lens group has a large curvature, thereby producing remarkably undercorrected high order spherical aberration at the tele position.

The condition (13) is necessary for maintaining Petzval's sum of the entire lens system at an adequate value, and correcting spherical aberration and distortion at the wide position. If the value in the condition (13) is smaller than the lower limit, the negative lens in the second lens group will have large curvatures to make Petzval's sum of the entire lens system too small, thereby aggravating sagital image plane curvature at the wide position and producing remarkably overcorrected high order spherical aberration as well as remarkably undercorrected distortion.

The conditions (14), (15) and (16) are necessary for correcting chromatic aberration in the entire lens system. Since the second, third and fourth groups have strong power, it is difficult to correct chromatic aberration in the entire lens system unless chromatic aberration of the individual lens groups is corrected. In all these conditions, if the value thereof exceeds the lower limit, chromatic aberration of the respective lens groups cannot be corrected.

BRIEF DESCRIPTION OF THE DRAWINGS

FIGS. 1, 2 and 3 are respectively sectional views showing first, second and third embodiments of a zoom lens system in accordance with the present invention in which all the lens groups are moved, and among them, a first lens group and a third lens group are integrally moved;

FIG. 4 is a sectional view of a lens system showing the fourth embodiment in which a fourth lens group is locked, and the first and third lens groups are integrally moved;

FIGS. 5 and 6 are respectively sectional views showing the fifth and sixth embodiments in which all the lens groups are moved, and the third and fifth lens groups are integrally moved;

FIG. 7 is a sectional view of a lens system showing the seventh embodiment in which the fourth lens group is locked and the third and fifth lens groups are integrally moved.

DETAILED DESCRIPTION OF THE PREFERRED EMBODIMENTS

In the following, the preferred embodiments of the present invention which satisfy all the aforementioned conditions will be illustrated.

The first through fourth embodiments are examples in which the first lens group and the third lens group are integrally moved, $t_{1.2}+t_{2.3}$ remaining unchanged by zooming. The fourth embodiment is an example in which the fourth lens group is locked and the sum of the back focus and $t_{4.5}$ is 64.599 which is constant.

The fifth through seventh embodiments are examples in which the third lens group and the fifth lens group are integrally moved, $t_{3.4}+t_{4.5}$ remaining unchanged by zooming. The seventh embodiment is an example in which the fourth lens group is locked, and the sum of the back focus and $t_{4.5}$ is 64.007 which is constant.

Embodiment 1 f = 35.935–102.961, F Number: 3.5–4.2
Field angle 2W = 22°38'–64°11'

| Dwg. No. | | R | D | n | ν |
|---|---|---|---|---|---|
| 1 | | 185.306 | 2.00 | 1.80518 | 25.4 |
| 2 | | 73.849 | 6.80 | 1.62299 | 58.2 |
| 3 | 1st lens | −396.945 | 0.20 | | |
| 4 | group | 61.247 | 5.30 | 1.62299 | 58.2 |
| 5 | | 171.424 | *t1.2 | | |
| 6 | | 471.412 | 1.20 | 1.71300 | 53.8 |
| 7 | | 23.316 | 6.55 | | |
| 8 | | −75.269 | 2.80 | 1.80518 | 25.4 |
| 9 | 2nd lens | −41.887 | 1.20 | 1.77250 | 49.6 |
| 10 | group | 146.612 | 0.20 | | |
| 11 | | 42.007 | 3.00 | 1.80518 | 25.4 |
| 12 | | 81.910 | *t2.3 | | |
| 13 | | 94.887 | 3.80 | 1.62299 | 58.2 |
| 14 | | −35.874 | 1.00 | 1.80518 | 25.4 |
| 15 | 3rd lens | −53.215 | 0.20 | | |
| 16 | group | 29.167 | 3.50 | 1.62299 | 58.2 |
| 17 | | 142.742 | *t3.4 | | |
| 18 | | 230.823 | 3.00 | 1.71736 | 29.5 |
| 19 | | −32.895 | 1.20 | 1.71300 | 53.8 |
| 20 | 4th lens | 64.352 | 1.50 | | |
| 21 | group | −33.608 | 1.00 | 1.71300 | 53.8 |
| 22 | | 119.484 | *t4.5 | | |
| 23 | | −63.017 | 5.50 | 1.71300 | 53.8 |
| 24 | | −16.412 | 1.00 | 1.80518 | 25.4 |
| 25 | | −26.401 | 0.20 | | |
| 26 | 5th lens | −170.315 | 1.00 | 1.80610 | 40.9 |
| 27 | group | 26.537 | 7.50 | 1.62299 | 58.2 |
| 28 | | −54.322 | 0.20 | | |
| 29 | | 48.635 | 7.00 | 1.62299 | 58.2 |
| 30 | | 159.140 | | | |

| Focal length | Back focus | F No. | t1.2 | t2.3 | t3.4 | t4.5 |
|---|---|---|---|---|---|---|
| 35.935 | 55.233 | 3.50 | 2.000 | 30.000 | 3.076 | 8.188 |
| 61.949 | 61.920 | 3.80 | 17.000 | 15.000 | 4.768 | 4.824 |
| 102.961 | 67.294 | 4.20 | 29.000 | 3.000 | 6.827 | 1.899 |

Figure 8:
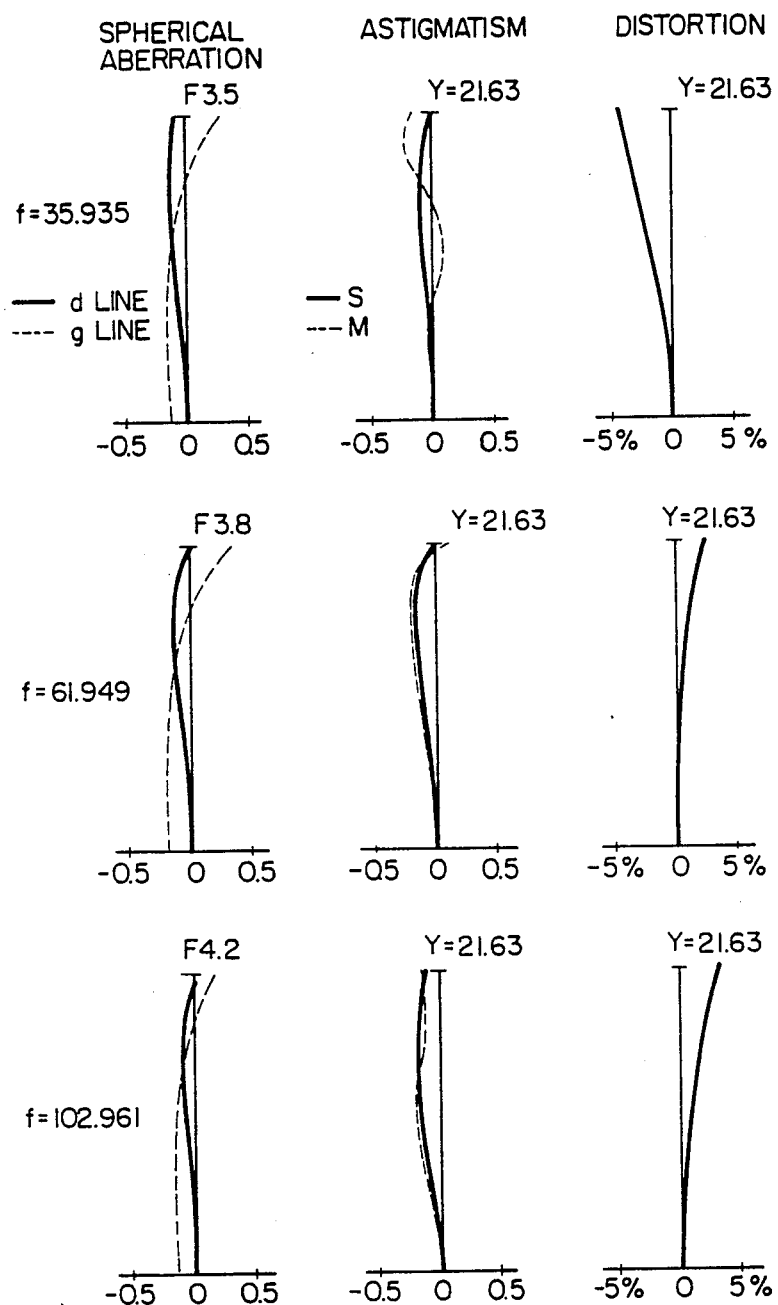
FIGS. 8 through 14 are respectively aberration curves showing spherical aberration, astigmatism and distortion aberration in the first through seventh embodiments.

$t_{1.2} + t_{2.3} = 32.000 \; t_{3.4} + t_{4.5} = 8.726–11.264$
$f_1 = 99.510 \; f_2 = -27.897 \; f_3 = 29.882 \; f_4 = -28.454$
$f_5 = 41.703$
$f_{1.2.W} = -44.748 \; f_{1.2.T} = -79.231 \; V = 2.865$ $\sqrt{V} = 1.693$ $f_{1.2.T}/f_{1.2.W} = 1.771 = 1.046 \sqrt{V}$ In the Embodiment 1, a sectional view of the lens is shown in FIG. 1, and an aberration curve is shown in FIG. 8.

Embodiment 2 f = 28.921–98.003, F Number: 3.5–4.3
Field angle 2W = 24°7'–75°0'

| Dwg. No. | | R | D | n | ν |
|---|---|---|---|---|---|
| 1 | | 132.240 | 2.00 | 1.80518 | 25.4 |
| 2 | | 65.018 | 7.50 | 1.62299 | 58.2 |
| 3 | 1st lens | −3290.247 | 0.20 | | |
| 4 | group | 66.017 | 4.50 | 1.62299 | 58.2 |
| 5 | | 211.638 | *t1.2 | | |
| 6 | | 192.963 | 1.20 | 1.77250 | 49.6 |
| 7 | | 21.617 | 6.55 | | |
| 8 | | −79.329 | 2.80 | 1.80518 | 25.4 |
| 9 | 2nd lens | −42.005 | 1.20 | 1.77250 | 49.6 |
| 10 | group | 85.784 | 0.20 | | |
| 11 | | 40.526 | 3.00 | 1.80518 | 25.4 |
| 12 | | 81.730 | *t2.3 | | |
| 13 | | 79.457 | 3.80 | 1.62299 | 58.2 |
| 14 | | −35.855 | 1.00 | 1.80518 | 25.4 |
| 15 | 3rd lens | −55.276 | 0.20 | | |
| 16 | group | 30.264 | 3.50 | 1.62299 | 58.2 |
| 17 | | 121.126 | *t3.4 | | |
| 18 | | 108.173 | 3.00 | 1.71736 | 29.5 |
| 19 | | −28.723 | 1.20 | 1.71300 | 53.8 |
| 20 | 4th lens | 61.234 | 1.50 | | |
| 21 | group | −33.160 | 1.00 | 1.71300 | 53.8 |
| 22 | | 131.613 | *t4.5 | | |
| 23 | | −74.484 | 5.50 | 1.71300 | 53.8 |
| 24 | | −15.476 | 1.00 | 1.80518 | 25.4 |
| 25 | | −27.695 | 0.20 | | |
| 26 | | −268.309 | 1.00 | 1.80610 | 40.9 |
| 27 | 5th lens | 27.689 | 7.50 | 1.62299 | 58.2 |
| 28 | group | −50.264 | 0.20 | | |
| 29 | | 46.461 | 5.00 | 1.62299 | 58.2 |
| 30 | | 117.881 | | | |

| Focal length | Back focus | F No. | t1.2 | t2.3 | t3.4 | t4.5 |
|---|---|---|---|---|---|---|
| 28.921 | 51.559 | 3.5 | 2.000 | 28.000 | 1.949 | 10.585 |
| 48.208 | 58.904 | 3.8 | 14.500 | 15.500 | 4.474 | 6.647 |
| 98.003 | 71.489 | 4.3 | 27.000 | 3.000 | 10.974 | 1.000 |

Figure 9:
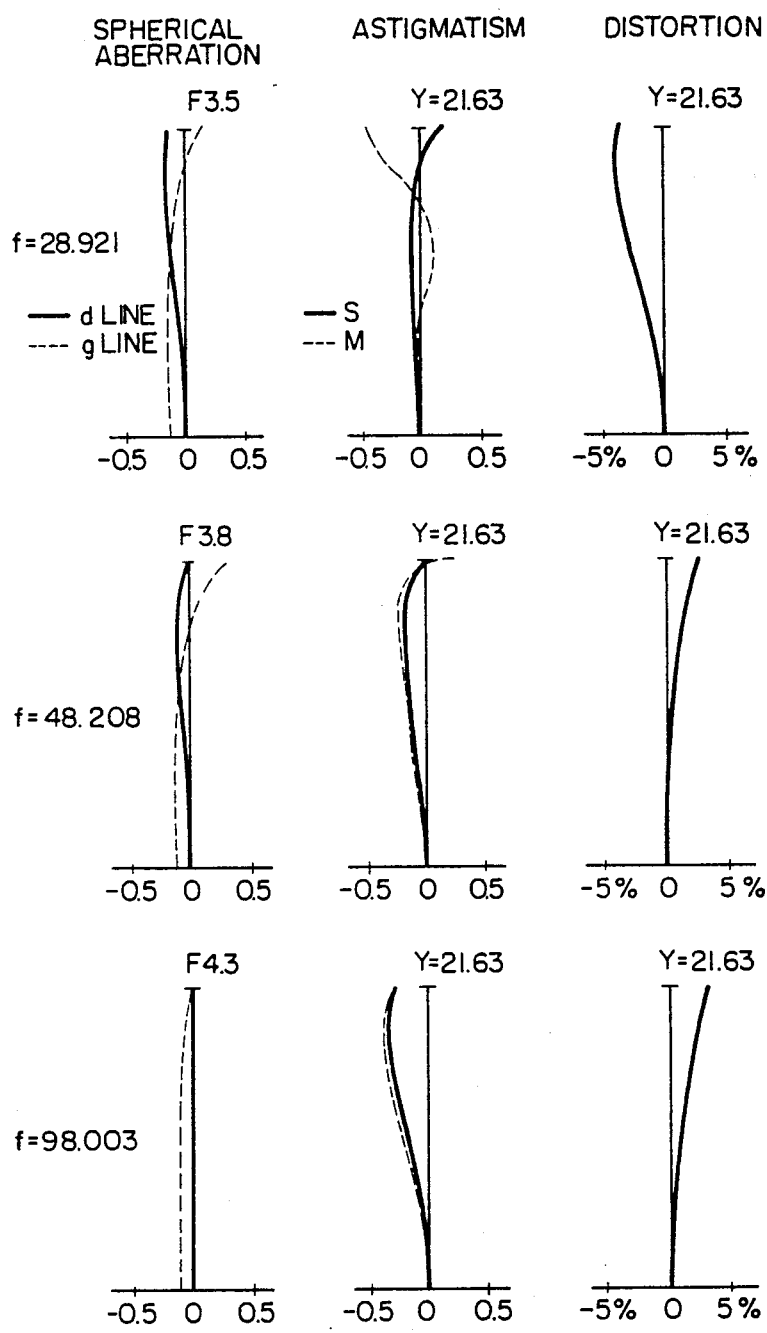

$t_{1.2} + t_{2.3} = 30.000 \; t_{3.4} + t_{4.5} = 11.121–12.534$
$f_1 = 100.602 \; f_2 = -23.859 \; f_3 = 30.653 \; f_4 = -31.825$
$f_5 = 38.828$
$f_{1.2.W} = -36.026 \; f_{1.2.T} = -57.663 \; V = 3.389$ $\sqrt{V} = 1.841$ $f_{1.2.T}/f_{1.2.W} = 1.601 = 0.870 \sqrt{V}$ In the Embodiment 2, a sectional view of the lens is shown in FIG. 2, and an aberration curve is shown in FIG. 9.

Embodiment 3 f = 35.810–103.041, F Number: 3.5–4.2
Field angle 2W = 22°36'–64°20'

| Dwg. No. | | R | D | n | ν |
|---|---|---|---|---|---|
| 1 | | 180.043 | 2.00 | 1.80518 | 25.4 |
| 2 | | 69.055 | 6.80 | 1.62299 | 58.2 |
| 3 | 1st lens | −256.509 | 0.20 | | |
| 4 | group | 58.556 | 5.30 | 1.62299 | 58.2 |
| 5 | | 132.053 | *t1.2 | | |
| 6 | | −3676.132 | 1.20 | 1.71300 | 53.8 |
| 7 | | 21.792 | 6.55 | | |
| 8 | | −71.439 | 2.80 | 1.80518 | 25.4 |
| 9 | 2nd lens | −39.242 | 1.2 | 1.77250 | 49.6 |
| 10 | group | 108.380 | 0.20 | | |
| 11 | | 42.410 | 3.00 | 1.80518 | 25.4 |
| 12 | | 99.233 | *t2.3 | | |
| 13 | | 77.510 | 3.80 | 1.62299 | 58.2 |
| 14 | | −32.744 | 1.00 | 1.80518 | 25.4 |
| 15 | 3rd lens | −51.775 | 0.20 | | |
| 16 | group | 30.599 | 3.50 | 1.62299 | 58.2 |
| 17 | | 299.075 | *t3.4 | | |
| 18 | | 240.352 | 3.00 | 1.71736 | 29.5 |
| 19 | | −30.606 | 1.20 | 1.71300 | 53.8 |
| 20 | 4th lens | 66.053 | 1.80 | | |

Embodiment 3-continued f = 35.810-103.041, F Number: 3.5-4.2
Field angle 2W = 22°36'-64°20'

| Dwg. No. | | R | D | n | ν |
|---|---|---|---|---|---|
| 21 | group | −33.222 | 1.00 | 1.71300 | 53.8 |
| 22 | | 123.353 | *t4.5 | | |
| 23 | | −77.126 | 5.50 | 1.71300 | 53.8 |
| 24 | | −16.550 | 1.00 | 1.80518 | 25.4 |
| 25 | | −27.355 | 0.20 | | |
| 26 | | −225.578 | 1.00 | 1.80610 | 40.9 |
| 27 | 5th lens | 23.987 | 7.50 | 1.62299 | 58.2 |
| 28 | group | −54.984 | 0.20 | | |
| 29 | | 51.229 | 5.00 | 1.62299 | 58.2 |
| 30 | | 130.320 | | | |

| Focal length | Back focus | F No. | $t_{1,2}$ | $t_{2,3}$ | $t_{3,4}$ | $t_{4,5}$ |
|---|---|---|---|---|---|---|
| 35.810 | 54.913 | 3.5 | 2.000 | 26.000 | 3.248 | 6.882 |
| 61.321 | 64.203 | 3.8 | 15.000 | 13.000 | 5.068 | 3.921 |
| 103.041 | 74.204 | 4.2 | 25.000 | 3.000 | 7.831 | 1.000 |

Figure 10:
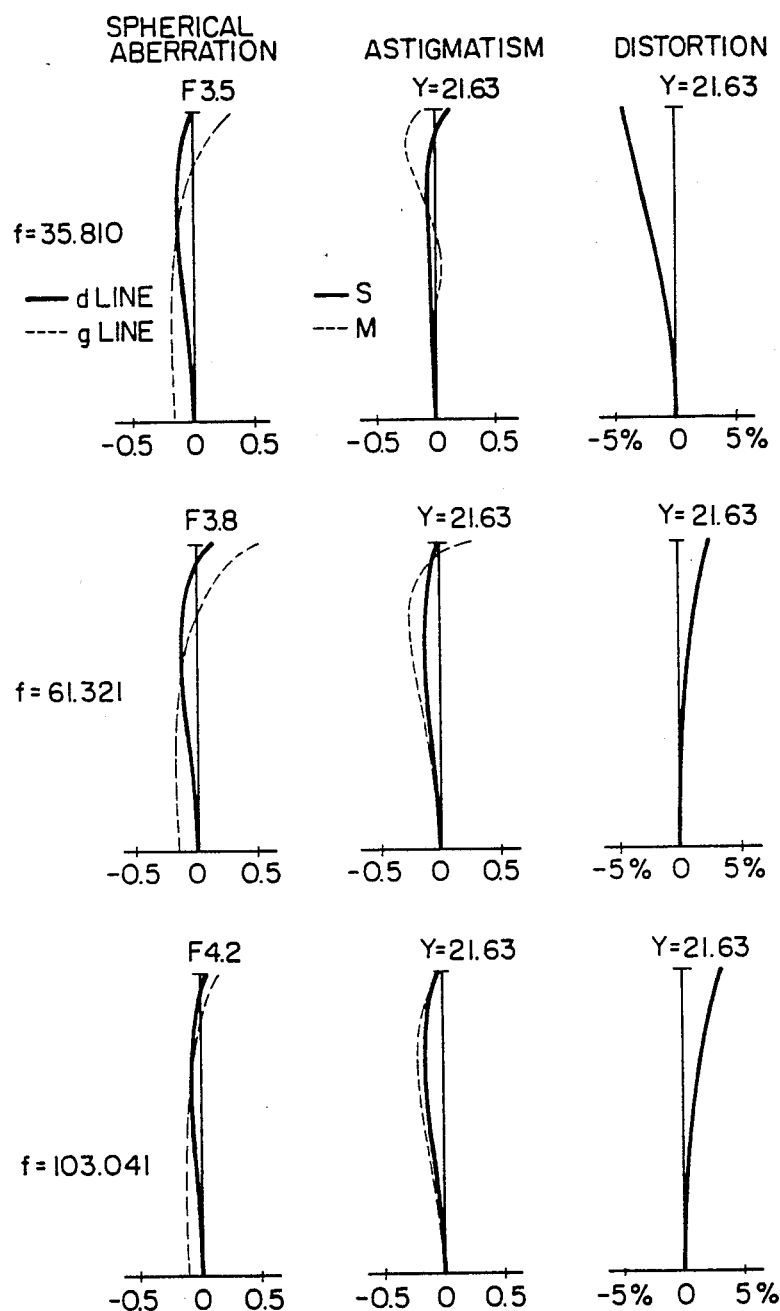

$t_{1,2} + t_{2,3} = 28.000 \; t_{3,4} + t_{4,5} = 8.831 - 10.130$
$f_1 = 96.964 \; f_2 = -24.456 \; f_3 = 27.913 \; f_4 = -28.491$
$f_5 = 42.915$
$f_{1,2,W} = -37.787 \; f_{1,2,T} = -59.648 \; V = 2.877$ $\sqrt{V} = 1.696$ $f_{1,2,T}/f_{1,2,W} = 1.579 = 0.931 \sqrt{V}$ In the Embodiment 3, a sectional view of the lens is shown in FIG. 1, and an aberration cruve is shown in FIG. 10.

Embodiment 4 f = 35.803-102.994, F Number 3.5-4.2
Field angle 2W = 22°40'-64°17'

| Dwg. No. | | R | D | n | ν |
|---|---|---|---|---|---|
| 1 | | 86.511 | 2.00 | 1.80518 | 25.4 |
| 2 | | 51.183 | 7.50 | 1.62299 | 58.2 |
| 3 | 1st lens | 427.762 | 0.20 | | |
| 4 | group | 70.885 | 4.50 | 1.62299 | 58.2 |
| 5 | | 199.838 | *t1.2 | | |
| 6 | | 233.759 | 1.20 | 1.77250 | 49.6 |
| 7 | | 23.682 | 6.55 | | |
| 8 | | −87.162 | 2.80 | 1.80518 | 25.4 |
| 9 | 2nd lens | −47.532 | 1.20 | 1.77250 | 49.6 |
| 10 | group | 137.152 | 0.20 | | |
| 11 | | 39.984 | 3.00 | 1.80518 | 25.4 |
| 12 | | 71.425 | *t2.3 | | |
| 13 | | 74.685 | 3.80 | 1.62299 | 58.2 |
| 14 | | −34.646 | 1.00 | 1.80515 | 25.4 |
| 15 | 3rd lens | −52.282 | 0.20 | | |
| 16 | group | 30.606 | 3.50 | 1.62299 | 58.2 |
| 17 | | 100.263 | *t3.4 | | |
| 18 | | 117.158 | 3.00 | 1.71736 | 29.5 |
| 19 | | −30.468 | 1.20 | 1.71300 | 53.8 |
| 20 | 4th lens | 57.676 | 1.50 | | |
| 21 | group | −31.452 | 1.00 | 1.71300 | 53.8 |
| 22 | | 101.387 | *t4.5 | | |
| 23 | | −67.226 | 5.50 | 1.71300 | 53.8 |
| 24 | | −15.451 | 1.00 | 1.80518 | 25.4 |
| 25 | | −25.924 | 0.20 | | |
| 26 | 5th lens | −236.667 | 1.00 | 1.80610 | 40.9 |
| 27 | group | 28.866 | 7.50 | 1.62299 | 58.2 |
| 28 | | −53.562 | 0.20 | | |
| 29 | | 44.733 | 5.00 | 1.62299 | 58.2 |
| 30 | | 98.677 | | | |

| Focal length | Back focus | F No. | $t_{1,2}$ | $t_{2,3}$ | $t_{3,4}$ | $t_{4,5}$ |
|---|---|---|---|---|---|---|
| 35.803 | 55.200 | 3.5 | 2.000 | 29.000 | 2.612 | 9.399 |
| 58.370 | 58.784 | 3.8 | 15.000 | 16.000 | 5.446 | 5.805 |
| 102.994 | 63.059 | 4.2 | 28.000 | 3.000 | 8.785 | 1.540 |

Figure 11:
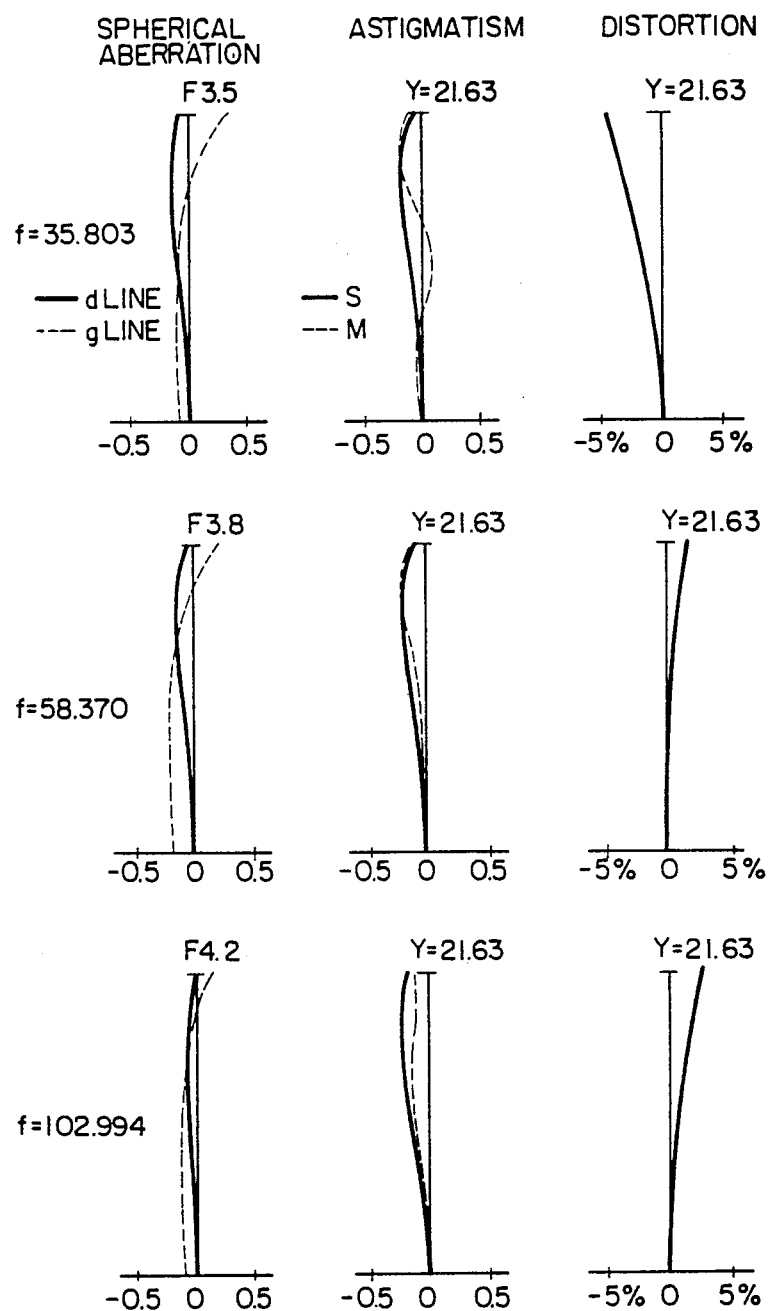

$t_{1,2} + t_{2,3} = 31.000 \; t_{3,4} + t_{4,5} = 10.325-12.011$
$f_1 = 100.51 \; f_2 = -28.137 \; f_3 = 30.715 \; f_4 = -28.133$
$f_5 = 39.199$
$f_{1,2,W} = -46.305 \; f_{1,2,T} = -80.627 \; V = 2.877$ $\sqrt{V} = 1.696$ $f_{1,2,T}/f_{1,2,W} = 1.741 = 1.027 \sqrt{V}$ In the Embodiment 4, a sectional view of the lens is shown in FIG. 4, and an aberration curve is shown in FIG. 11.

Embodiment 5 f = 35.883-132.932, F Number: 4.0-4.5
Field angle 2W = 17°8'-64°32'

| Dwg. No. | | R | D | n | ν |
|---|---|---|---|---|---|
| 1 | | 79.807 | 2.00 | 1.80518 | 25.4 |
| 2 | | 49.150 | 10.00 | 1.62299 | 58.2 |
| 3 | 1st lens | 2402.421 | 0.20 | | |
| 4 | group | 84.472 | 5.00 | 1.62299 | 58.2 |
| 5 | | 149.339 | *t1.2 | | |
| 6 | | 515.057 | 1.20 | 1.77250 | 49.6 |
| 7 | | 23.383 | 6.55 | | |
| 8 | | −97.957 | 2.80 | 1.80518 | 25.4 |
| 9 | 2nd lens | −48.976 | 1.20 | 1.77250 | 49.6 |
| 10 | group | 111.808 | 0.20 | | |
| 11 | | 40.421 | 3.00 | 1.80518 | 25.4 |
| 12 | | 81.902 | *t2.3 | | |
| 13 | | 77.746 | 3.80 | 1.62299 | 58.2 |
| 14 | | −32.635 | 1.00 | 1.80518 | 25.4 |
| 15 | 3rd lens | −48.929 | 0.20 | | |
| 16 | group | 26.561 | 4.00 | 1.51633 | 64.1 |
| 17 | | 78.257 | *t3.4 | | |
| 18 | | 89.883 | 3.00 | 1.71736 | 29.5 |
| 19 | | −27.834 | 1.20 | 1.71300 | 53.8 |
| 20 | 4th lens | 53.655 | 1.50 | | |
| 21 | group | −32.823 | 1.00 | 1.77250 | 49.6 |
| 22 | | 82.977 | *t4.5 | | |
| 23 | | −113.128 | 5.50 | 1.71300 | 53.8 |
| 24 | | −16.331 | 1.00 | 1.80518 | 25.4 |
| 25 | | −26.955 | 0.20 | | |
| 26 | | −564.041 | 1.00 | 1.80610 | 40.9 |
| 27 | 5th lens | 26.471 | 7.50 | 1.62299 | 58.2 |
| 28 | group | −68.614 | 0.20 | | |
| 29 | | 41.394 | 4.00 | 1.62299 | 58.2 |
| 30 | | 73.597 | | | |

| Focal length | Back focus | F No. | $t_{1,2}$ | $t_{2,3}$ | $t_{3,4}$ | $t_{4,5}$ |
|---|---|---|---|---|---|---|
| 35.883 | 59.917 | 4.0 | 2.000 | 33.149 | 2.000 | 9.000 |
| 72.585 | 67.297 | 4.2 | 21.875 | 15.509 | 5.500 | 5.500 |
| 132.932 | 70.480 | 4.5 | 36.693 | 3.000 | 9.000 | 2.000 |

Figure 5:
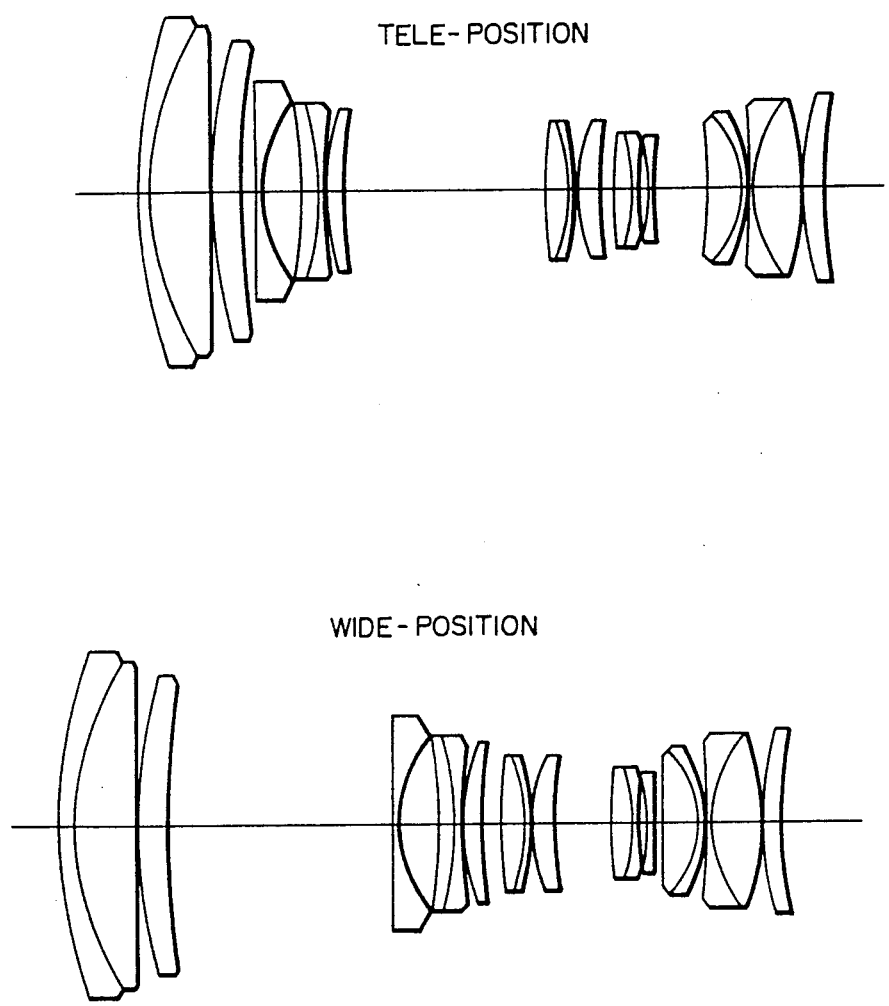
Figure 12:
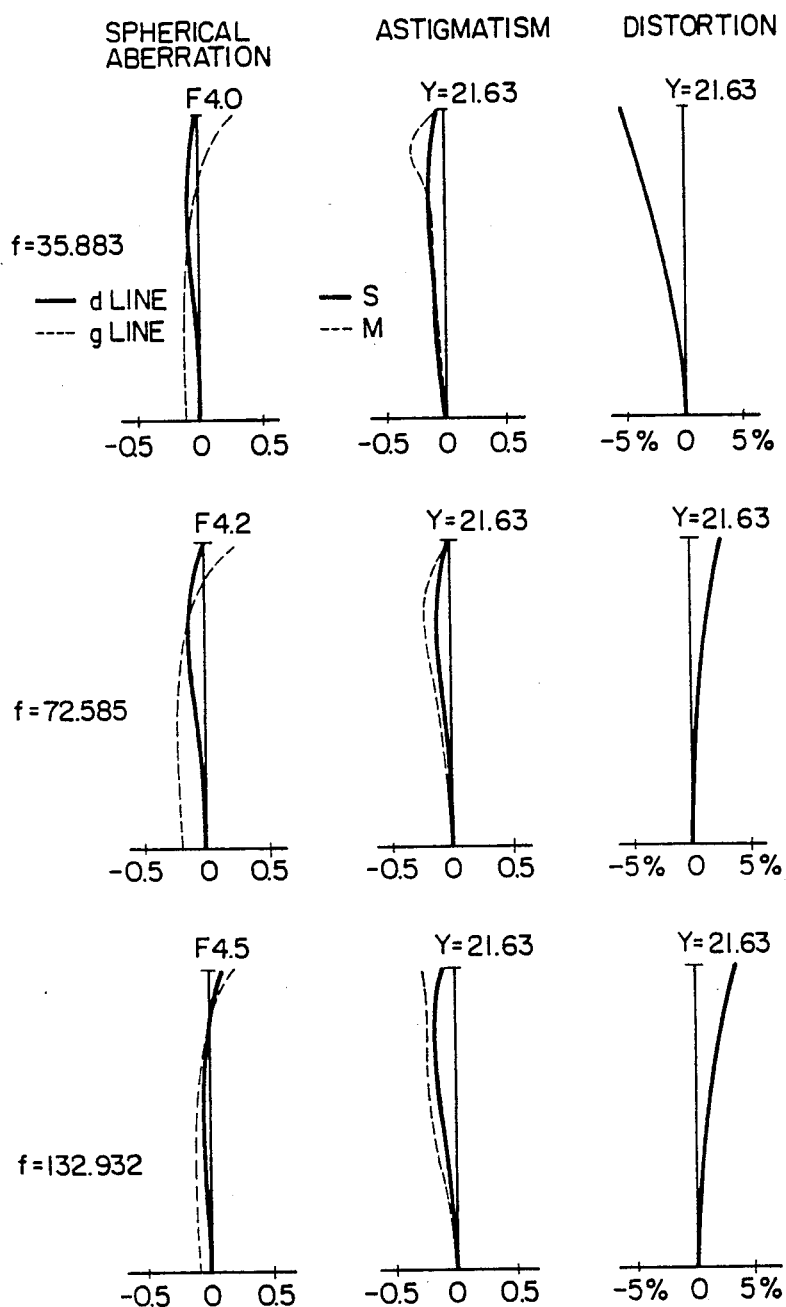

$t_{1,2,W} + t_{2,3,W} = 35.149 \; t_{1,2,T} + t_{2,3,T} = 39.693$
$t_{3,4} + t_{4,5} = 11.000$
$f_1 = 106.569 \; f_2 = -27.231 \; f_3 = 31.398$
$f_4 = -26.680 \; f_5 = 38.525$
$f_{1,2,W} = -44.057 \; f_{1,2,T} = -93.086 \; V = 3.705$ $\sqrt{V} = 1.925$ $f_{1,2,T}/f_{1,2,W} = 2.113 = 1.098 \sqrt{V}$ In the Embodiment 5, a sectional view of the lens is shown in FIG. 5, and an aberration curve is shown in FIG. 12.

Embodiment 6 f = 36.104-102.939, F Number: 3.5-4.0
Field angle 2W = 22°36'-64°6'

| Dwg. No. | | R | D | n | ν |
|---|---|---|---|---|---|
| 1 | | 182.980 | 2.00 | 1.80518 | 25.4 |

Embodiment 6-continued f = 36.104–102.939, F Number: 3.5–4.0
Field angle 2W = 22°36'–64°6'

| Dwg. No. | | R | D | n | ν |
|---|---|---|---|---|---|
| 2 | | 78.165 | 7.00 | 1.62299 | 58.2 |
| 3 | 1st lens | −298.992 | 0.20 | | |
| 4 | group | 50.294 | 5.00 | 1.62299 | 58.2 |
| 5 | | 84.902 | *t1.2 | | |
| 6 | | 259.037 | 1.20 | 1.71300 | 53.8 |
| 7 | | 18.729 | 6.30 | | |
| 8 | | −107.291 | 2.50 | 1.80518 | 25.4 |
| 9 | 2nd lens | −41.214 | 1.00 | 1.77250 | 49.6 |
| 10 | group | 93.742 | 0.20 | | |
| 11 | | 30.285 | 3.00 | 1.80518 | 25.4 |
| 12 | | 48.098 | *t2.3 | | |
| 13 | | 68.554 | 4.75 | 1.58913 | 61.0 |
| 14 | | −19.405 | 1.00 | 1.80518 | 25.4 |
| 15 | 3rd lens | −31.374 | 0.20 | | |
| 16 | group | 25.090 | 3.40 | 1.58913 | 61.0 |
| 17 | | 59.894 | *t3.4 | | |
| 18 | | 141.604 | 4.00 | 1.71736 | 29.5 |
| 19 | | −17.954 | 1.00 | 1.77250 | 49.6 |
| 20 | 4th lens | 45.679 | 2.00 | | |
| 21 | group | −33.608 | 1.00 | 1.71300 | 53.8 |
| 22 | | 205.992 | *t4.5 | | |
| 23 | | −121.883 | 5.00 | 1.71300 | 53.8 |
| 24 | | −16.360 | 1.00 | 1.80518 | 25.4 |
| 25 | | −26.104 | 0.20 | | |
| 26 | 5th lens | −95.437 | 1.00 | 1.80610 | 40.9 |
| 27 | group | 27.014 | 7.50 | 1.59813 | 61.0 |
| 28 | | −49.270 | 0.20 | | |
| 29 | | 45.071 | 4.30 | 1.58913 | 61.0 |
| 30 | | 258.896 | | | |

| Focal length | Back focus | F No. | $t_{1.2}$ | $t_{2.3}$ | $t_{3.4}$ | $t_{4.5}$ |
|---|---|---|---|---|---|---|
| 36.104 | 59.060 | 3.5 | 2.000 | 21.942 | 2.000 | 7.700 |
| 59.515 | 62.344 | 3.8 | 20.739 | 13.479 | 4.200 | 5.500 |
| 102.939 | 65.703 | 4.0 | 35.943 | | 4.500 | 7.000 | 2.700 |

$t_{1.2.W} + t_{2.3.W} = 23.942$   $t_{1.2.T} + t_{2.3.T} = 40.443$
$t_{3.4} + t_{4.5} = 9.700$
$f_1 = 105.484$   $f_2 = -23.974$   $f_3 = 27.034$   $f_4 = -25.111$
$f_5 = 38.120$
$f_{1.2.W} = -35.769$   $f_{1.2.T} = -68.800$   V = 2.851

$\sqrt{v} = 1.689$ $f_{1.2.T}/f_{1.2.W} = 1.923 = 1.139 \sqrt{v}$

Figure 13:
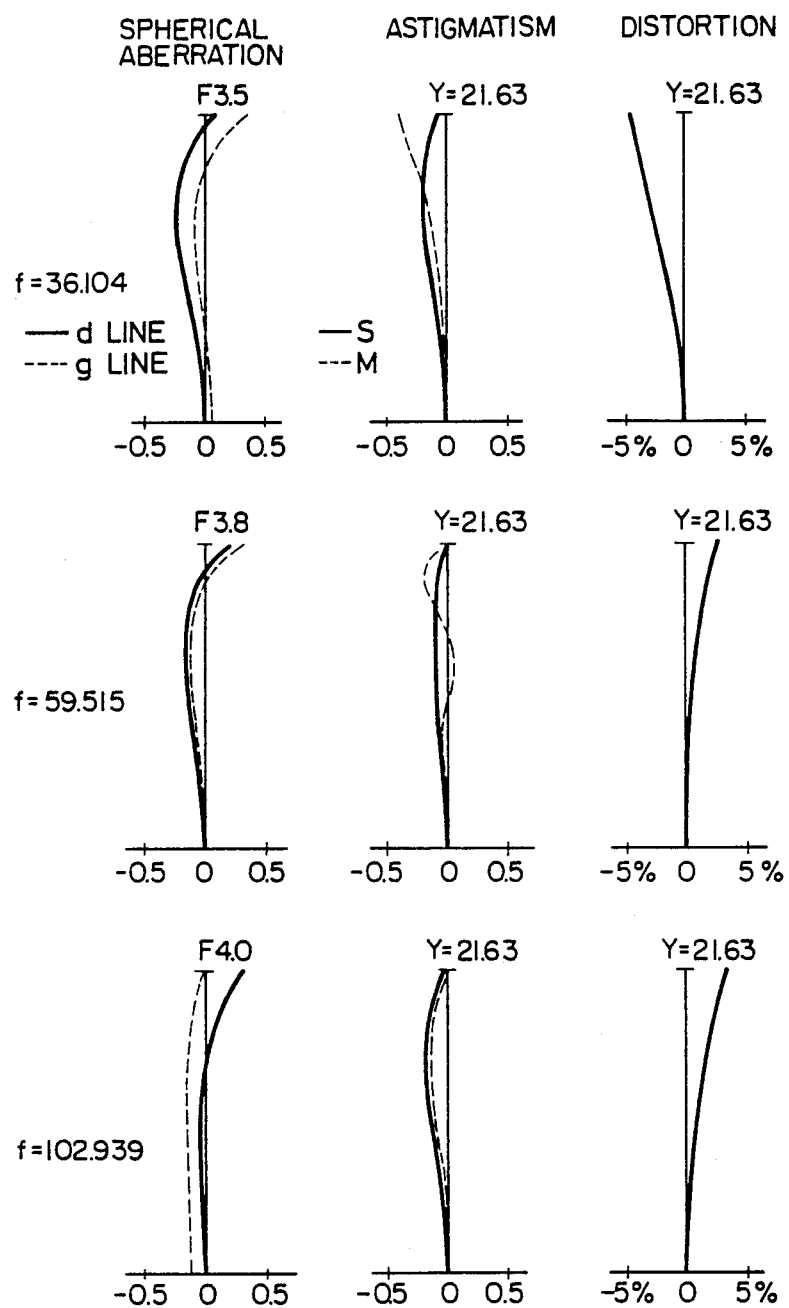

In the Embodiment 6, a sectional view of the lens is shown in FIG. 6, and an aberration curve is shown in FIG. 13.

Embodiment 7 f = 36.037–103.028, F Number: 3.5–4.0
Field angle 2W = 22°43'–63°5'

| Dwg. No. | | R | D | n | ν |
|---|---|---|---|---|---|
| 1 | | 92.178 | 2.00 | 1.80518 | 25.4 |
| 2 | | 55.258 | 6.80 | 1.62299 | 58.2 |
| 3 | 1st lens | 626.009 | 0.20 | | |
| 4 | group | 77.220 | 5.30 | 1.62299 | 58.2 |
| 5 | | 138.991 | *t1.2 | | |
| 6 | | 130.208 | 1.20 | 1.77250 | 49.6 |
| 7 | | 22.668 | 6.55 | | |
| 8 | | −91.004 | 2.80 | 1.80518 | 25.4 |
| 9 | 2nd lens | −48.131 | 1.20 | 177.250 | 49.6 |
| 10 | group | 173.421 | 0.20 | | |
| 11 | | 38.169 | 3.00 | 1.80518 | 25.4 |
| 12 | | 61.321 | *t2.3 | | |
| 13 | | 70.330 | 3.80 | 1.62299 | 58.2 |
| 14 | | −36.916 | 1.00 | 1.80518 | 25.4 |
| 15 | 3rd lens | −52.865 | 0.20 | | |
| 16 | group | 29.748 | 3.50 | 1.62299 | 58.2 |
| 17 | | 81.902 | *t3.4 | | |
| 18 | | 149.300 | 3.00 | 1.71736 | 29.5 |
| 19 | | −34.917 | 1.20 | 1.71300 | 53.8 |
| 20 | 4th lens | 59.961 | 1.50 | | |

Embodiment 7-continued f = 36.037–103.028, F Number: 3.5–4.0
Field angle 2W = 22°43'–63°5'

| Dwg. No. | | R | D | n | ν |
|---|---|---|---|---|---|
| 21 | group | −32.764 | 1.00 | 1.71300 | 53.8 |
| 22 | | 113.669 | *t4.5 | | |
| 23 | | −63.315 | 5.50 | 1.71300 | 53.8 |
| 24 | | −16.032 | 1.00 | 1.80518 | 25.4 |
| 25 | | −26.000 | 0.20 | | |
| 26 | | −365.900 | 1.00 | 1.80610 | 40.9 |
| 27 | 5th lens | 26.112 | 7.50 | 1.62299 | 58.2 |
| 28 | group | −60.838 | 0.20 | | |
| 29 | | 41.996 | 7.00 | 1.62299 | 58.2 |
| 30 | | 94.554 | | | |

| Focal length | Back focus | F No. | $t_{1.2}$ | $t_{2.3}$ | $t_{3.4}$ | $t_{4.5}$ |
|---|---|---|---|---|---|---|
| 36.037 | 54.997 | 3.5 | 2.000 | 28.940 | 1.990 | 9.010 |
| 57.524 | 58.007 | 3.8 | 18.360 | 16.816 | 5.000 | 6.000 |
| 103.028 | 62.007 | 4.0 | 35.500 | 3.986 | 9.000 | 2.000 |

$t_{1.2.W} + t_{2.3.W} = 30.940$   $t_{1.2.T} + t_{2.3.T} = 39.486$
$t_{3.4} + t_{4.5} = 11.000$
$f_1 = 122.660$   $f_2 = -29.892$   $f_3 = 30.741$   $f_4 = -28.641$
$f_5 = 39.804$
$f_{1.2.W} = -45.971$   $f_{1.2.T} = -79.263$   V = 2.859

$\sqrt{v} = 1.691$ $f_{1.2.T}/f_{1.2.W} = 1.724 = 1.020 \sqrt{v}$

Figure 14:
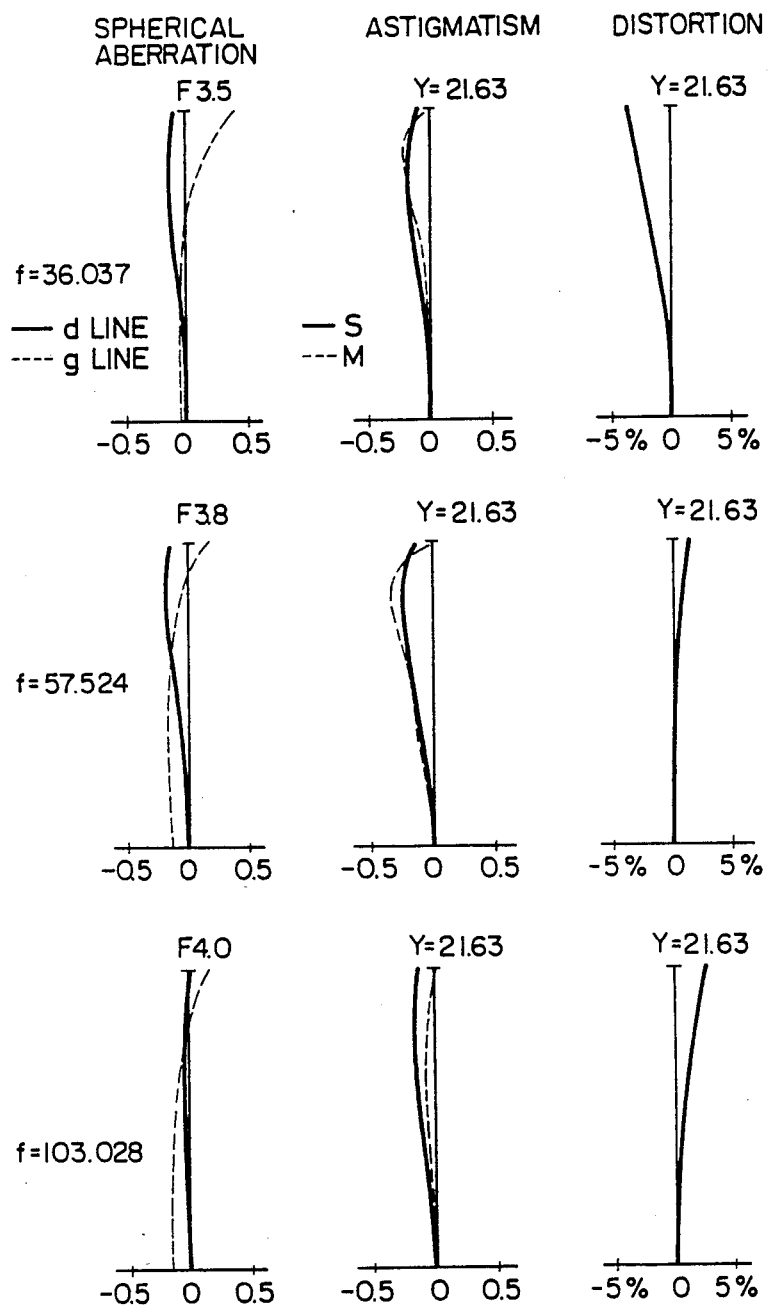

In the Embodiment 7, a sectional view of the lens is shown in FIG. 3, and an aberration curve is shown in FIG. 14.

What is claimed is:

1. A compact, wide magnification-variable zoom lens system comprising a first lens group having a positive focal length, a second lens group having a negative focal length, a third lens group having a positive focal length, a fourth lens group having a negative focal length and a fifth lens group having a positive focal length in the order from the object side, characterized in that
    (1) over the entire range of zooming, a partial system consisting of the first lens group and the second lens group has a negative resultant focal length and a partial system consisting of the third through fifth lens groups has a positive resultant focal length;
    (2) the third lens group and another positive lens group are moved integrally; and
    (3) when zooming is carried out from the wide position to the tele position, the individual lens groups are moved so that an airspace formed between the first lens group and the second lens group and an airspace formed between the third lens group and the fourth lens group may be increased while an airspace formed between the fourth lens group and the fifth lens group may be decreased.

2. The zoom lens system according to claim 1, which satisfies the following conditions:

$$0.2 f_w < t_{3.4} + t_{4.5} < 0.5 f_w$$

$$0.8 f_T < f_1 < 1.2 f_T$$

$$0.5 f_w < |f_2| < 1.0 f_w$$

$$0.6 f_w < f_3 < 1.2 f_w$$

$$0.5 f_w < |f_4| < 1.2 f_w$$

$$0.9 f_w < f_5 < 1.5 f_w$$

-continued $$0.9 f_w < |f_{1.2w}| < 1.5 f_w$$

$$0.8 \sqrt{v} \leq f_{1.2T}/f_{1.2w} < 1.2 \sqrt{v}$$

where
- $f_w$: focal length of the zoom lens system as a whole at its wide position
- $f_T$: focal length of the zoom lens system as a whole at its tele position
- $f_i$: focal length of the ith lens group from the object side
- $f_{1.2w}$: focal length of the partial system consisting of the first and second lens groups at the wide position
- $f_{1.2T}$: focal length of the aforesaid partial system at the tele position
- $v$: zooming ratio fT/fw
- $t_{i.i+1}$: airspace between the ith lens group and the i+1 lens group.

3. The zoom lens system according to claims 1 or 2 wherein the first lens group and the third lens group are integrally moved.

4. The zoom lens system according to claim 3 which satisfies $$0.6fw < t_{1.2} + t_{2.3} < 1.2fw$$

where:
- R: radius of curvature of the lens surface
- D: center thickness, or airspace between lens surfaces; *represents the airspace is variable
- n: refractive index of the lens
- $v$: Abee's number of the lens.

5. The zoom lens system according to claim 4 which comprises a first lens group having at least one positive lens component, which is a doublet consisting of a positive single lens and a negative single lens, a second lens group consisting of two negative lens components and one positive lens component, the first lens component on the object side having a negative single lens in which a powerful concave face is directed towards the image side, and a third lens group having at least two positive lens components, one of which is a doublet consisting of a positive single lens and a negative single lens.

6. The zoom lens system according to claim 5 which satisfies the following conditions:

$$0.50fw < R_{2.2} < 0.85fw$$

$$1.7 > N_{p2}$$

$$1.7 > N_{N2}$$

$$40 > v_{N2}$$

$$50 > v_{p3}$$

$$40 > v_{N4}$$

where
- $R_{2.2}$: radius of curvature of the image side of the first group lens in the second lens group
- $N_{pi}$: means value of refraction indices of the positive lens elements arranged in the ith lens group
- $N_{Ni}$: mean value of refractive indices of the negative lens elements arranged in the ith lens group
- $v_{pi}$: mean value of Abbe's numbers of the positive lens elements arranged in the ith lens group
- $v_{Ni}$: mean value of Abbe's numbers of the negative lens elements arranged in the ith lens group.

7. The zoom lens system according to claim 1 or 2 wherein the third lens group and the fifth lens group are integrally moved.

8. The zoom lens system according to claim 7 which satisfies $$0.5fw < t_{1.2w} + t_{2.3w} < t_{1.2T} + t_{2.3T} < 0.5f_T$$

where:
- $t_{i.i+1w}$: airspace between the ith lens group and the i+1 lens group at the wide position
- $t_{1.i+1T}$: airspace between the ith lens group and the i+1 lens group at the tele position.
- R: radius of curvature of the lens surface
- D: center thickness, or airspace between lens surfaces; *represents the airspace is variable
- n: refractive index of the lens
- $v$: Abbe's number of the lens.

9. The zoom lens system according to claim 8 which comprises a first lens group having at least one positive lens component, which is a doublet consisting of a positive single lens and a negative single lens, a second lens group consisting of two negative lens components and one positive lens component, the first lens component on the object side having a negative single lens in which a powerful concave face is directed towards the image side, and a third lens group having at least two positive lens components, one of which is a doublet consisting of a positive single lens and a negative single lens.

10. The zoom lens system according to claim 9 which satisfies the following conditions:

$$0.50fw < R_{2.2} < 0.85fw$$

$$1.7 < N_{p2}$$

$$1.7 < N_{N2}$$

$$40 < v_{N2}$$

$$50 < v_{p3}$$

$$40 < v_{N4}$$

where
- $R_{2.2}$: radius of curvature of the image side of the first group lens in the second lens group
- $N_{pi}$: mean value of refractive indices of the positive lens elements arranged in the ith lens group
- $N_{Ni}$: mean value of refractive indices of the negative lens elements arranged in the ith lens group
- $v_{pi}$: mean value of Abbe's numbers of the positive lens elements arranged in the ith lens group
- $v_{Ni}$: mean value of Abbe's numbers of the negative lens elements arranged in the ith lens group where:
- R: radius of curvature of the lens surface
- D: center thickness or airspace between lens surfaces; *represents the airspace is variable
- n: refractive index of the lens.

11. The zoom lens system according to claim 4 which is illustrated by data as follows:

| | f = 35.935–102.961, F Number: 3.5–4.2 Field angle 2W = 22°38'–64°11' | | | | |
|---|---|---|---|---|---|
| Dwg. No. | | R | D | n | ν |
| 1 | | 185.306 | 2.00 | 1.80518 | 25.4 |
| 2 | | 73.849 | 6.80 | 1.62299 | 58.2 |
| 3 | 1st lens group | −396.945 | 0.20 | | |
| 4 | | 61.247 | 5.30 | 1.62299 | 58.2 |
| 5 | | 171.424 | *t1.2 | | |
| 6 | | 471.412 | 1.20 | 1.71300 | 53.8 |
| 7 | | 23.316 | 6.55 | | |
| 8 | | −75.269 | 2.80 | 1.80518 | 25.4 |
| 9 | 2nd lens group | −41.887 | 1.20 | 1.77250 | 49.6 |
| 10 | | 146.612 | 0.20 | | |
| 11 | | 42.007 | 3.00 | 1.80518 | 25.4 |
| 12 | | 81.910 | *t2.3 | | |
| 13 | | 94.887 | 3.80 | 1.62299 | 58.2 |
| 14 | | −35.874 | 1.00 | 1.80518 | 25.4 |
| 15 | 3rd lens group | −53.215 | 0.20 | | |
| 16 | | 29.167 | 3.50 | 1.62299 | 58.2 |
| 17 | | 142.742 | *t3.4 | | |
| 18 | | 230.823 | 3.00 | 1.71736 | 29.5 |
| 19 | | −32.895 | 1.20 | 1.71300 | 53.8 |
| 20 | 4th lens group | 64.352 | 1.50 | | |
| 21 | | −33.608 | 1.00 | 1.71300 | 53.8 |
| 22 | | 119.484 | *t4.5 | | |
| 23 | | −63.017 | 5.50 | 1.71300 | 53.8 |
| 24 | | −16.412 | 1.00 | 1.80518 | 25.4 |
| 25 | | −26.401 | 0.20 | | |
| 26 | 5th lens group | −170.315 | 1.00 | 1.80610 | 40.9 |
| 27 | | 26.537 | 7.50 | 1.62299 | 58.2 |
| 28 | | −54.322 | 0.20 | | |
| 29 | | 48.635 | 7.00 | 1.62299 | 58.2 |
| 30 | | 159.140 | | | |

| Focal length | Back focus | F No. | $t_{1.2}$ | $t_{2.3}$ | $t_{3.4}$ | $t_{4.5}$ |
|---|---|---|---|---|---|---|
| 35.935 | 55.233 | 3.50 | 2.000 | 30.000 | 3.076 | 8.188 |
| 61.949 | 61.920 | 3.80 | 17.000 | 15.000 | 4.768 | 4.824 |
| 102.961 | 67.294 | 4.20 | 29.000 | 3.000 | 6.827 | 1.899 |

$t_{1.2} + t_{2.3} = 32.000 \quad t_{3.4} + t_{4.5} = 8.726–11.264$
$f_1 = 99.510 \quad f_2 = −27.897 \quad f_3 = 29.882 \quad f_4 = −28.454$
$f_5 = 41.703$
$f_{1.2.W} = −44.748 \quad f_{1.2.T} = −79.231 \quad V = 2.865$ $\sqrt{v} = 1.693$ $f_{1.2.T}/f_{1.2.W} = 1.771 = 1.046 \sqrt{v}$ 12. The zoom lens system according to claim 4 which is illustrated by data as follows:

| | f = 28.921–98.003, F Number: 3.5–4.3 Field angle 2W = 24°7'–75°0' | | | | |
|---|---|---|---|---|---|
| Dwg. No. | | R | D | n | ν |
| 1 | | 132.240 | 2.00 | 1.80518 | 25.4 |
| 2 | | 65.018 | 7.50 | 1.62299 | 58.2 |
| 3 | 1st lens group | −3290.247 | 0.20 | | |
| 4 | | 66.017 | 4.50 | 1.62299 | 58.2 |
| 5 | | 211.638 | *t1.2 | | |
| 6 | | 192.963 | 1.20 | 1.77250 | 49.6 |
| 7 | | 21.617 | 6.55 | | |
| 8 | | −79.329 | 2.80 | 1.80518 | 25.4 |
| 9 | 2nd lens group | −42.005 | 1.20 | 1.77250 | 49.6 |
| 10 | | 85.784 | 0.20 | | |
| 11 | | 40.526 | 3.00 | 1.80518 | 25.4 |
| 12 | | 81.730 | *t2.3 | | |
| 13 | | 79.457 | 3.80 | 1.62299 | 58.2 |
| 14 | | −35.855 | 1.00 | 1.80518 | 25.4 |
| 15 | 3rd lens group | −55.276 | 0.20 | | |
| 16 | | 30.264 | 3.50 | 1.62299 | 58.2 |
| 17 | | 121.126 | *t3.4 | | |
| 18 | | 108.173 | 3.00 | 1.71736 | 29.5 |
| 19 | | −28.723 | 1.20 | 1.71300 | 53.8 |
| 20 | 4th lens group | 61.234 | 1.50 | | |
| 21 | | −33.160 | 1.00 | 1.71300 | 53.8 |

-continued

| | f = 28.921–98.003, F Number: 3.5–4.3 Field angle 2W = 24°7'–75°0' | | | | |
|---|---|---|---|---|---|
| Dwg. No. | | R | D | n | ν |
| 22 | | 131.613 | *t4.5 | | |
| 23 | | −74.484 | 5.50 | 1.71300 | 53.8 |
| 24 | | −15.476 | 1.00 | 1.80518 | 25.4 |
| 25 | | −27.695 | 0.20 | | |
| 26 | | −268.309 | 1.00 | 1.80610 | 40.9 |
| 27 | 5th lens group | 27.689 | 7.50 | 1.62299 | 58.2 |
| 28 | | −50.264 | 0.20 | | |
| 29 | | 46.461 | 5.00 | 1.62299 | 58.2 |
| 30 | | 117.881 | | | |

| Focal length | Back focus | F No. | $t_{1.2}$ | $t_{2.3}$ | $t_{3.4}$ | $t_{4.5}$ |
|---|---|---|---|---|---|---|
| 28.921 | 51.559 | 3.5 | 2.000 | 28.000 | 1.949 | 10.585 |
| 48.208 | 58.904 | 3.8 | 14.500 | 15.500 | 4.474 | 6.647 |
| 98.003 | 71.489 | 4.3 | 27.000 | 3.000 | 10.974 | 1.000 |

$t_{1.2} + t_{2.3} = 30.000 \quad t_{3.4} + t_{4.5} = 11.121–12.534$
$f_1 = 100.602 \quad f_2 = −23.859 \quad f_3 = 30.653 \quad f_4 = −31.825$
$f_5 = 38.828$
$f_{1.2.W} = −36.026 \quad f_{1.2.T} = −57.663 \quad V = 3.389$ $\sqrt{v} = 1.841$ $f_{1.2.T}/f_{1.2.W} = 1.601 = 0.870 \sqrt{v}$ 13. The zoom lens system according to claim 4 which is illustrated by data as follows:

| | f = 35.810–103.041, F Number: 3.5–4.2 Field angle 2W = 22°36'–64°20' | | | | |
|---|---|---|---|---|---|
| Dwg. No. | | R | D | n | ν |
| 1 | | 180.043 | 2.00 | 1.80518 | 25.4 |
| 2 | | 69.055 | 6.80 | 1.62299 | 58.2 |
| 3 | 1st lens group | −256.509 | 0.20 | | |
| 4 | | 58.556 | 5.30 | 1.62299 | 58.2 |
| 5 | | 132.053 | *t1.2 | | |
| 6 | | −3676.132 | 1.20 | 1.71300 | 53.8 |
| 7 | | 21.792 | 6.55 | | |
| 8 | | −71.439 | 2.80 | 1.80518 | 25.4 |
| 9 | 2nd lens group | −39.242 | 1.2 | 1.77250 | 49.6 |
| 10 | | 108.380 | 0.20 | | |
| 11 | | 42.410 | 3.00 | 1.80518 | 25.4 |
| 12 | | 99.233 | *t2.3 | | |
| 13 | | 77.510 | 3.80 | 1.62299 | 58.2 |
| 14 | | −32.744 | 1.00 | 1.80518 | 25.4 |
| 15 | 3rd lens group | −51.775 | 0.20 | | |
| 16 | | 30.599 | 3.50 | 1.62299 | 58.2 |
| 17 | | 299.075 | *t3.4 | | |
| 18 | | 240.352 | 3.00 | 1.71736 | 29.5 |
| 19 | | −30.606 | 1.20 | 1.71300 | 53.8 |
| 20 | 4th lens group | 66.053 | 1.80 | | |
| 21 | | −33.222 | 1.00 | 1.71300 | 53.8 |
| 22 | | 123.353 | *t4.5 | | |
| 23 | | −77.126 | 5.50 | 1.71300 | 53.8 |
| 24 | | −16.550 | 1.00 | 1.80518 | 25.4 |
| 25 | | −27.355 | 0.20 | | |
| 26 | | −225.578 | 1.00 | 1.80610 | 40.9 |
| 27 | 5th lens group | 23.987 | 7.50 | 1.62299 | 58.2 |
| 28 | | −54.984 | 0.20 | | |
| 29 | | 51.229 | 5.00 | 1.62299 | 58.2 |
| 30 | | 130.320 | | | |

| Focal length | Back focus | F No. | $t_{1.2}$ | $t_{2.3}$ | $t_{3.4}$ | $t_{4.5}$ |
|---|---|---|---|---|---|---|
| 35.810 | 54.913 | 3.5 | 2.000 | 26.000 | 3.248 | 6.882 |
| 61.321 | 64.203 | 3.8 | 15.000 | 13.000 | 5.068 | 3.921 |

-continued

| Focal length | Back focus | F No. | $t_{1,2}$ | $t_{2,3}$ | $t_{3,4}$ | $t_{4,5}$ |
|---|---|---|---|---|---|---|
| 103.041 | 74.204 | 4.2 | 25.000 | 3.000 | 7.831 | 1.000 |

$t_{1,2} + t_{2,3} = 28.000$ $t_{3,4} + t_{4,5} = 8.831 - 10.130$
$f_1 = 96.964$ $f_2 = -24.456$ $f_3 = 27.913$ $f_4 = -28.491$
$f_5 = 42.915$
$f_{1,2,W} = -37.787$ $f_{1,2,T} = -59.648$ $V = 2.877$ $\sqrt{V} = 1.696$ $f_{1,2,T}/f_{1,2,W} = 1.579 = 0.931 \sqrt{V}$ 14. The zoom lens system according to claim 4 which is illustrated by data as follows:

f = 35.803–102.994, F Number 3.5–4.2
Field angle 2W = 22°40'–64°17'

| Dwg. No. | | R | D | n | ν |
|---|---|---|---|---|---|
| 1 | | 86.511 | 2.00 | 1.80518 | 25.4 |
| 2 | | 51.183 | 7.50 | 1.62299 | 58.2 |
| 3 | 1st lens group | 427.762 | 0.20 | | |
| 4 | | 70.885 | 4.50 | 1.62299 | 58.2 |
| 5 | | 199.838 | *t1.2 | | |
| 6 | | 233.759 | 1.20 | 1.77250 | 49.6 |
| 7 | | 23.682 | 6.55 | | |
| 8 | | −87.162 | 2.80 | 1.80518 | 25.4 |
| 9 | 2nd lens group | −47.532 | 1.20 | 1.77250 | 49.6 |
| 10 | | 137.152 | 0.20 | | |
| 11 | | 39.984 | 3.00 | 1.80518 | 25.4 |
| 12 | | 71.425 | *t2.3 | | |
| 13 | | 74.685 | 3.80 | 1.62299 | 58.2 |
| 14 | | −34.646 | 1.00 | 1.80515 | 25.4 |
| 15 | 3rd lens group | −52.282 | 0.20 | | |
| 16 | | 30.606 | 3.50 | 1.62299 | 58.2 |
| 17 | | 100.263 | *t3.4 | | |
| 18 | | 117.158 | 3.00 | 1.71736 | 29.5 |
| 19 | | −30.468 | 1.20 | 1.71300 | 53.8 |
| 20 | 4th lens group | 57.676 | 1.50 | | |
| 21 | | −31.452 | 1.00 | 1.71300 | 53.8 |
| 22 | | 101.387 | *t4.5 | | |
| 23 | | −67.226 | 5.50 | 1.71300 | 53.8 |
| 24 | | −15.451 | 1.00 | 1.80518 | 25.4 |
| 25 | | −25.924 | 0.20 | | |
| 26 | | −236.667 | 1.00 | 1.80610 | 40.9 |
| 27 | 5th lens group | 28.866 | 7.50 | 1.62299 | 58.2 |
| 28 | | −53.562 | 0.20 | | |
| 29 | | 44.733 | 5.00 | 1.62299 | 58.2 |
| 30 | | 98.677 | | | |

| Focal length | Back focus | F No. | $t_{1,2}$ | $t_{2,3}$ | $t_{3,4}$ | $t_{4,5}$ |
|---|---|---|---|---|---|---|
| 35.803 | 55.200 | 3.5 | 2.000 | 29.000 | 2.612 | 9.399 |
| 58.370 | 58.784 | 3.8 | 15.000 | 16.000 | 5.446 | 5.805 |
| 102.994 | 63.059 | 4.2 | 28.000 | 3.000 | 8.785 | 1.540 |

$t_{1,2} + t_{2,3} = 31.000$ $t_{3,4} + t_{4,5} = 10.325 - 12.011$
$f_1 = 100.51$ $f_2 = -28.137$ $f_3 = 30.715$ $f_4 = -28.133$
$f_5 = 39.199$
$f_{1,2,W} = -46.305$ $f_{1,2,T} = -80.627$ $V = 2.877$ $\sqrt{V} = 1.696$ $f_{1,2,T}/f_{1,2,W} = 1.741 = 1.027 \sqrt{V}$ 15. The zoom lens system according to claim 8 which is illustrated by data as follows:

f = 35.883–132.932, F Number: 4.0–4.5
Field angle 2W = 17°8'–64°32'

| Dwg. No. | | R | D | n | ν |
|---|---|---|---|---|---|
| 1 | | 79.807 | 2.00 | 1.80518 | 25.4 |
| 2 | | 49.150 | 10.00 | 1.62299 | 58.2 |
| 3 | 1st lens group | 2402.421 | 0.20 | | |
| 4 | | 84.472 | 5.00 | 1.62299 | 58.2 | f = 35.883–132.932, F Number: 4.0–4.5
Field angle 2W = 17°8'–64°32'

| Dwg. No. | | R | D | n | ν |
|---|---|---|---|---|---|
| 5 | | 149.339 | *t1.2 | | |
| 6 | | 515.057 | 1.20 | 1.77250 | 49.6 |
| 7 | | 23.383 | 6.55 | | |
| 8 | | −97.957 | 2.80 | 1.80518 | 25.4 |
| 9 | 2nd lens group | −48.976 | 1.20 | 1.77250 | 49.6 |
| 10 | | 111.808 | 0.20 | | |
| 11 | | 40.421 | 3.00 | 1.80518 | 25.4 |
| 12 | | 81.902 | *t2.3 | | |
| 13 | | 77.746 | 3.80 | 1.62299 | 58.2 |
| 14 | | −32.635 | 1.00 | 1.80518 | 25.4 |
| 15 | 3rd lens group | −48.929 | 0.20 | | |
| 16 | | 26.561 | 4.00 | 1.51633 | 64.1 |
| 17 | | 78.257 | *t3.4 | | |
| 18 | | 89.883 | 3.00 | 1.71736 | 29.5 |
| 19 | | −27.834 | 1.20 | 1.71300 | 53.8 |
| 20 | 4th lens group | 53.655 | 1.50 | | |
| 21 | | −32.823 | 1.00 | 1.77250 | 49.6 |
| 22 | | 82.977 | *t4.5 | | |
| 23 | | −113.128 | 5.50 | 1.71300 | 53.8 |
| 24 | | −16.331 | 1.00 | 1.80518 | 25.4 |
| 25 | | −26.955 | 0.20 | | |
| 26 | | −564.041 | 1.00 | 1.80610 | 40.9 |
| 27 | 5th lens group | 26.471 | 7.50 | 1.62299 | 58.2 |
| 28 | | −68.614 | 0.20 | | |
| 29 | | 41.394 | 4.00 | 1.62299 | 58.2 |
| 30 | | 73.597 | | | |

| Focal length | Back focus | F No. | $t_{1,2}$ | $t_{2,3}$ | $t_{3,4}$ | $t_{4,5}$ |
|---|---|---|---|---|---|---|
| 35.883 | 59.917 | 4.0 | 2.000 | 33.149 | 2.000 | 9.000 |
| 72.585 | 67.297 | 4.2 | 21.875 | 15.509 | 5.500 | 5.500 |
| 132.932 | 70.480 | 4.5 | 36.693 | 3.000 | 9.000 | 2.000 |

$t_{1,2,W} + t_{2,3,W} = 35.149$ $t_{1,2,T} + t_{2,3,T} = 39.693$
$t_{3,4} + t_{4,5} = 11.000$
$f_1 = 106.569$ $f_2 = -27.231$ $f_3 = 31.398$
$f_4 = -26.680$ $f_5 = 38.525$
$f_{1,2,W} = -44.057$ $f_{1,2,T} = -93.086$ $V = 3.705$ $\sqrt{V} = 1.925$ $f_{1,2,T}/f_{1,2,W} = 2.113 = 1.098 \sqrt{V}$ 16. The zoom lens system according to claim 8 which is illustrated by data as follows:

f = 36.104–102.939, F Number: 3.5–4.0
Field angle 2W = 22°36'–64°6'

| Dwg. No. | | R | D | n | ν |
|---|---|---|---|---|---|
| 1 | | 182.980 | 2.00 | 1.80518 | 25.4 |
| 2 | | 78.165 | 7.00 | 1.62299 | 58.2 |
| 3 | 1st lens group | −298.992 | 0.20 | | |
| 4 | | 50.294 | 5.00 | 1.62299 | 58.2 |
| 5 | | 84.902 | *t1.2 | | |
| 6 | | 259.037 | 1.20 | 1.71300 | 53.8 |
| 7 | | 18.729 | 6.30 | | |
| 8 | | −107.291 | 2.50 | 1.80518 | 25.4 |
| 9 | 2nd lens group | −41.214 | 1.00 | 1.77250 | 49.6 |
| 10 | | 93.742 | 0.20 | | |
| 11 | | 30.285 | 3.00 | 1.80518 | 25.4 |
| 12 | | 48.098 | *t2.3 | | |
| 13 | | 68.554 | 4.75 | 1.58913 | 61.0 |
| 14 | | −19.405 | 1.00 | 1.80518 | 25.4 |
| 15 | 3rd lens group | −31.374 | 0.20 | | |
| 16 | | 25.090 | 3.40 | 1.58913 | 61.0 |
| 17 | | 59.894 | *t3.4 | | |
| 18 | | 141.604 | 4.00 | 1.71736 | 29.5 |
| 19 | | −17.954 | 1.00 | 1.77250 | 49.8 |
| 20 | 4th lens group | 45.679 | 2.00 | | |
| 21 | | −33.608 | 1.00 | 1.71300 | 53.8 |
| 22 | | 205.992 | *t4.5 | | |
| 23 | | −121.883 | 5.00 | 1.71300 | 53.8 |
| 24 | | −16.860 | 1.00 | 1.80518 | 25.4 |

-continued f = 36.104–102.939, F Number: 3.5–4.0
Field angle 2W = 22°36'–64°6'

| Dwg. No. | | R | D | n | ν |
|---|---|---|---|---|---|
| 25 | | −26.104 | 0.20 | | |
| 26 | | −95.437 | 1.00 | 1.80610 | 40.9 |
| 27 | 5th lens | 27.014 | 7.50 | 1.58913 | 61.0 |
| 28 | group | −49.270 | 0.20 | | |
| 29 | | 45.071 | 4.30 | 1.58913 | 61.0 |
| 30 | | 258.896 | | | |

| Focal length | Back focus | F No. | $t_{1,2}$ | $t_{2,3}$ | $t_{3,4}$ | $t_{4,5}$ |
|---|---|---|---|---|---|---|
| 36.104 | 59.060 | 3.5 | 2.000 | 21.942 | 2.000 | 7.700 |
| 59.515 | 62.344 | 3.8 | 20.739 | 13.479 | 4.200 | 5.500 |
| 102.939 | 65.703 | 4.0 | 35.943 | 4.500 | 7.000 | 2.700 |

$t_{1,2,W} + t_{2,3,W} = 23.942$  $t_{1,2,T} + t_{2,3,T} = 40.443$
$t_{3,4} + t_{4,5} = 9.700$
$f_1 = 105.484$  $f_2 = -23.974$  $f_3 = 27.034$  $f_4 = -25.111$
$f_5 = 38.120$
$f_{1,2,W} = -35.769$  $f_{1,2,T} = -68.800$  V = 2.851

$\sqrt{v} = 1.689$ $f_{1,2,T}/f_{1,2,W} = 1.923 = 1.139 \sqrt{v}$

17. The zoom lens system according to claim 8 which is illustrated by data as follows:

f = 36.037–103.028, F Number: 3.5–4.0
Field angle 2W = 22°43'–63°5'

| Dwg. No. | | R | D | n | ν |
|---|---|---|---|---|---|
| 1 | | 92.178 | 2.00 | 1.80518 | 25.4 |
| 2 | | 55.258 | 6.80 | 1.62299 | 58.2 |
| 3 | 1st lens | 626.009 | 0.20 | | |
| 4 | group | 77.220 | 5.30 | 1.62299 | 58.2 |
| 5 | | 138.991 | *$t_{1,2}$ | | |
| 6 | | 130.208 | 1.20 | 1.77250 | 49.6 |
| 7 | | 22.668 | 6.55 | | |
| 8 | | −91.004 | 2.80 | 1.80518 | 25.4 |
| 9 | 2nd lens | −48.131 | 1.20 | 177.250 | 49.6 |
| 10 | group | 173.421 | 0.20 | | |
| 11 | | 38.169 | 3.00 | 1.80518 | 25.4 |
| 12 | | 61.321 | *$t_{2,3}$ | | |
| 13 | | 70.330 | 3.80 | 1.62299 | 58.2 |
| 14 | | −36.916 | 1.00 | 1.80518 | 25.4 |
| 15 | 3rd lens | −52.865 | 0.20 | | |
| 16 | group | 29.748 | 3.50 | 1.62299 | 58.2 |
| 17 | | 81.902 | *$t_{3,4}$ | | |
| 18 | | 149.300 | 3.00 | 1.71736 | 29.5 |
| 19 | | −34.917 | 1.20 | 1.71300 | 53.8 |
| 20 | 4th lens | 59.961 | 1.50 | | |
| 21 | group | −32.764 | 1.00 | 1.71300 | 53.8 |
| 22 | | 113.669 | *$t_{4,5}$ | | |
| 23 | | −63.315 | 5.50 | 1.71300 | 53.8 |
| 24 | | −16.032 | 1.00 | 1.80518 | 25.4 |
| 25 | | −26.000 | 0.20 | | |
| 26 | | −365.900 | 1.00 | 1.80610 | 40.9 |
| 27 | 5th lens | 26.112 | 7.50 | 1.62299 | 58.2 |
| 28 | group | −60.828 | 0.20 | | |
| 29 | | 41.996 | 7.00 | 1.62299 | 58.2 |
| 30 | | 94.554 | | | |

| Focal length | Back focus | F No. | $t_{1,2}$ | $t_{2,3}$ | $t_{3,4}$ | $t_{4,5}$ |
|---|---|---|---|---|---|---|
| 36.037 | 54.997 | 3.5 | 2.000 | 28.940 | 1.990 | 9.010 |
| 57.524 | 58.007 | 3.8 | 18.360 | 16.816 | 5.000 | 6.000 |
| 103.028 | 62.007 | 4.0 | 35.500 | 3.986 | 9.000 | 2.000 |

$t_{1,2,W} + t_{2,3,W} = 30.940$  $t_{1,2,T} + t_{2,3,T} = 39.486$
$t_{3,4} + t_{4,5} = 11.000$
$f_1 = 122.660$  $f_2 = -29.892$  $f_3 = 30.741$  $f_4 = -28.641$
$f_5 = 39.804$
$f_{1,2,W} = -45.971$  $f_{1,2,T} = -79.263$  V = 2.859

$\sqrt{v} = 1.691$ $f_{1,2,T}/f_{1,2,W} = 1.724 = 1.020 \sqrt{v}$

18. The zoom lens system according to claim 10 which is illustrated by data as follows:

f = 35.883–132.932, F Number: 4.0–4.5
Field angle 2W = 17°8'–64°32'

| Dwg. No. | | R | D | n | ν |
|---|---|---|---|---|---|
| 1 | | 79.807 | 2.00 | 1.80518 | 25.4 |
| 2 | | 49.150 | 10.00 | 1.62299 | 58.2 |
| 3 | 1st lens | 2402.421 | 0.20 | | |
| 4 | group | 84.472 | 5.00 | 1.62299 | 58.2 |
| 5 | | 149.339 | *$t_{1,2}$ | | |
| 6 | | 515.057 | 1.20 | 1.77250 | 49.6 |
| 7 | | 23.383 | 6.55 | | |
| 8 | | −97.957 | 2.80 | 1.80518 | 25.4 |
| 9 | 2nd lens | −48.976 | 1.20 | 1.77250 | 49.6 |
| 10 | group | 111.808 | 0.20 | | |
| 11 | | 40.421 | 3.00 | 1.80518 | 25.4 |
| 12 | | 81.902 | *$t_{2,3}$ | | |
| 13 | | 77.746 | 3.80 | 1.62299 | 58.2 |
| 14 | | −32.635 | 1.00 | 1.80518 | 25.4 |
| 15 | 3rd lens | −48.929 | 0.20 | | |
| 16 | group | 26.561 | 4.00 | 1.51633 | 64.1 |
| 17 | | 78.257 | *$t_{3,4}$ | | |
| 18 | | 89.883 | 3.00 | 1.71736 | 29.5 |
| 19 | | −27.834 | 1.20 | 1.71300 | 53.8 |
| 20 | 4th lens | 53.655 | 1.50 | | |
| 21 | group | −32.823 | 1.00 | 1.77250 | 49.6 |
| 22 | | 82.977 | *$t_{4,5}$ | | |
| 23 | | −113.128 | 5.50 | 1.71300 | 53.8 |
| 24 | | −16.331 | 1.00 | 1.80518 | 25.4 |
| 25 | | −26.955 | 0.20 | | |
| 26 | | −564.041 | 1.00 | 1.80610 | 40.9 |
| 27 | 5th lens | 26.471 | 7.50 | 1.62299 | 58.2 |
| 28 | group | −68.614 | 0.20 | | |
| 29 | | 41.394 | 4.00 | 1.62299 | 58.2 |
| 30 | | 73.597 | | | |

| Focal length | Back focus | F No. | $t_{1,2}$ | $t_{2,3}$ | $t_{3,4}$ | $t_{4,5}$ |
|---|---|---|---|---|---|---|
| 35.883 | 59.917 | 4.0 | 2.000 | 33.149 | 2.000 | 9.000 |
| 72.585 | 67.297 | 4.2 | 21.875 | 15.509 | 5.500 | 5.500 |
| 132.932 | 70.480 | 4.5 | 36.693 | 3.000 | 9.000 | 2.000 |

$t_{1,2,W} + t_{2,3,W} = 35.149$  $t_{1,2,T} + t_{2,3,T} = 39.693$
$t_{3,4} + t_{4,5} = 11.000$
$f_1 = 106.569$  $f_2 = -27.231$  $f_3 = 31.398$
$f_4 = -26.680$  $f_5 = 38.525$
$f_{1,2,W} = -44.057$  $f_{1,2,T} = -93.086$  V = 3.705

$\sqrt{v} = 1.925$ $f_{1,2,T}/f_{1,2,W} = 2.113 = 1.098 \sqrt{v}$

19. The zoom lens system according to claim 10 which is illustrated by data as follows:

f = 36.104–102.939, F Number: 3.5–4.0
Field angle 2W = 22°36'–64°6'

| Dwg. No. | | R | D | n | ν |
|---|---|---|---|---|---|
| 1 | | 182.980 | 2.00 | 1.80518 | 25.4 |
| 2 | | 78.165 | 7.00 | 1.62299 | 58.2 |

-continued

| Dwg. No. | | R | D | n | ν |
|---|---|---|---|---|---|
| | | f = 36.104–102.939, F Number: 3.5–4.0 | | | |
| | | Field angle 2W = 22°36'–64°6' | | | |
| 3 | 1st lens group | −298.992 | 0.20 | | |
| 4 | | 50.294 | 5.00 | 1.62299 | 58.2 |
| 5 | | 84.902 | *t1.2 | | |
| 6 | | 259.037 | 1.20 | 1.71300 | 53.8 |
| 7 | | 18.729 | 6.30 | | |
| 8 | | −107.291 | 2.50 | 1.80518 | 25.4 |
| 9 | 2nd lens group | −41.214 | 1.00 | 1.77250 | 49.6 |
| 10 | | 93.742 | 0.20 | | |
| 11 | | 30.285 | 3.00 | 1.80518 | 25.4 |
| 12 | | 48.098 | *t2.3 | | |
| 13 | | 68.554 | 4.75 | 1.58913 | 61.0 |
| 14 | | −19.405 | 1.00 | 1.80518 | 25.4 |
| 15 | 3rd lens group | −31.374 | 0.20 | | |
| 16 | | 25.090 | 3.40 | 1.58913 | 61.0 |
| 17 | | 59.894 | *t3.4 | | |
| 18 | | 141.604 | 4.00 | 1.71736 | 29.5 |
| 19 | | −17.954 | 1.00 | 1.77250 | 49.8 |
| 20 | 4th lens group | 45.679 | 2.00 | | |
| 21 | | −33.608 | 1.00 | 1.71300 | 53.8 |
| 22 | | 205.992 | *t4.5 | | |
| 23 | | −121.883 | 5.00 | 1.71300 | 53.8 |
| 24 | | −16.860 | 1.00 | 1.80518 | 25.4 |
| 25 | | −26.104 | 0.20 | | |
| 26 | | −95.437 | 1.00 | 1.80610 | 40.9 |
| 27 | 5th lens group | 27.014 | 7.50 | 1.58913 | 61.0 |
| 28 | | −49.270 | 0.20 | | |
| 29 | | 45.071 | 4.30 | 1.58913 | 61.0 |
| 30 | | 258.896 | | | |

| Focal length | Back focus | F No. | t1.2 | t2.3 | t3.4 | t4.5 |
|---|---|---|---|---|---|---|
| 36.104 | 59.060 | 3.5 | 2.000 | 21.942 | 2.000 | 7.700 |
| 59.515 | 62.344 | 3.8 | 20.739 | 13.479 | 4.200 | 5.500 |
| 102.939 | 65.703 | 4.0 | 35.943 | 4.500 | 7.000 | 2.700 |

$t_{1.2,W} + t_{2.3,W} = 23.942$  $t_{1.2,T} + t_{2.3,T} = 40.443$
$t_{3.4} + t_{4.5} = 9.700$
$f_1 = 105.484$  $f_2 = -23.974$  $f_3 = 27.034$  $f_4 = -25.111$
$f_5 = 38.120$
$f_{1.2,W} = -35.769$  $f_{1.2,T} = -68.800$  $V = 2.851$ $\sqrt{V} = 1.689$ $f_{1.2,T}/f_{1.2,W} = 1.923 = 1.139\sqrt{V}$ 20. The zoom lens system according to claim 10 which is illustrated by data as follows:

| Dwg. No. | | R | D | n | ν |
|---|---|---|---|---|---|
| | | f = 36.037–103.028, F Number: 3.5–4.0 | | | |
| | | Field angle 2W = 22°43'–63°5' | | | |
| 1 | | 92.178 | 2.00 | 1.80518 | 25.4 |
| 2 | | 55.258 | 6.80 | 1.62299 | 58.2 |
| 3 | 1st lens group | 626.009 | 0.20 | | |
| 4 | | 77.220 | 5.30 | 1.62299 | 58.2 |
| 5 | | 138.991 | *t1.2 | | |
| 6 | | 130.208 | 1.20 | 1.77250 | 49.6 |
| 7 | | 22.668 | 6.55 | | |
| 8 | | −91.004 | 2.80 | 1.80518 | 25.4 |
| 9 | 2nd lens group | −48.131 | 1.20 | 177.250 | 49.6 |
| 10 | | 173.421 | 0.20 | | |
| 11 | | 38.169 | 3.00 | 1.80518 | 25.4 |
| 12 | | 61.321 | *t2.3 | | |
| 13 | | 70.330 | 3.80 | 1.62299 | 58.2 |
| 14 | | −36.916 | 1.00 | 1.80518 | 25.4 |
| 15 | 3rd lens group | −52.865 | 0.20 | | |
| 16 | | 29.748 | 3.50 | 1.62299 | 58.2 |
| 17 | | 81.902 | *t3.4 | | |
| 18 | | 149.300 | 3.00 | 1.71736 | 29.5 |
| 19 | | −34.917 | 1.20 | 1.71300 | 53.8 |
| 20 | 4th lens group | 59.961 | 1.50 | | |
| 21 | | −32.764 | 1.00 | 1.71300 | 53.8 |
| 22 | | 113.669 | *t4.5 | | |
| 23 | | −63.315 | 5.50 | 1.71300 | 53.8 |
| 24 | | −16.032 | 1.00 | 1.80518 | 25.4 |
| 25 | | −26.000 | 0.20 | | |
| 26 | | −365.900 | 1.00 | 1.80610 | 40.9 |
| 27 | 5th lens group | 26.112 | 7.50 | 1.62299 | 58.2 |
| 28 | | −60.828 | 0.20 | | |
| 29 | | 41.996 | 7.00 | 1.62299 | 58.2 |
| 30 | | 94.554 | | | |

| Focal length | Back focus | F No. | t1.2 | t2.3 | t3.4 | t4.5 |
|---|---|---|---|---|---|---|
| 36.037 | 54.997 | 3.5 | 2.000 | 28.940 | 1.990 | 9.010 |
| 57.524 | 58.007 | 3.8 | 18.360 | 16.816 | 5.000 | 6.000 |
| 103.028 | 62.007 | 4.0 | 35.500 | 3.986 | 9.000 | 2.000 |

$t_{1.2,W} + t_{2.3,W} = 30.940$  $t_{1.2,T} + t_{2.3,T} = 39.486$
$t_{3.4} + t_{4.5} = 11.000$
$f_1 = 122.660$  $f_2 = -29.892$  $f_3 = 30.741$  $f_4 = -28.641$
$f_5 = 39.804$
$f_{1.2,W} = -45.971$  $f_{1.2,T} = -79.263$  $V = 2.859$ $\sqrt{V} = 1.691$ $f_{1.2,T}/f_{1.2,W} = 1.724 = 1.020\sqrt{V}$

* * * * *

UNITED STATES PATENT AND TRADEMARK OFFICE
CERTIFICATE OF CORRECTION

PATENT NO. : 4,498,741

DATED : February 12, 1985

INVENTOR(S) : Shozo Ishiyama

It is certified that error appears in the above-identified patent and that said Letters Patent is hereby corrected as shown below:

On the Title page, the Priority Information should read --Japanese Patent Application Nos. 49346 and 49347, both filed April 3, 1981--.

Signed and Sealed this

Twenty-eighth Day of May 1985

[SEAL]

Attest:

DONALD J. QUIGG

Attesting Officer     Acting Commissioner of Patents and Trademarks